(12) United States Patent
Park

(10) Patent No.: US 6,353,466 B1
(45) Date of Patent: Mar. 5, 2002

(54) APPARATUS FOR TESTING AN LCD

(75) Inventor: Kum Sung Park, Songnam-shi (KR)

(73) Assignee: DE & T Co., Ltd. (KR)

( * ) Notice: Subject to any disclaimer, the term of this patent is extended or adjusted under 35 U.S.C. 154(b) by 0 days.

(21) Appl. No.: 09/556,456

(22) Filed: Apr. 24, 2000

(30) Foreign Application Priority Data

Apr. 23, 1999 (KR) ............................................. 99-14683
Apr. 23, 1999 (KR) ............................................. 99-14684
Apr. 23, 1999 (KR) ............................................. 99-14685

(51) Int. Cl.[7] ........................ G02F 1/1333; G01R 31/00; B65H 1/00
(52) U.S. Cl. ...................... 349/58; 324/770; 414/226.05
(58) Field of Search .................. 349/58, 187; 324/770, 324/158.1; 414/403, 416.05, 222.01, 222.04, 226.05; 250/599.45, 599.29

(56) References Cited

U.S. PATENT DOCUMENTS

| | | | |
|---|---|---|---|
| 3,569,718 A | * 3/1971 | Borner | 250/201 |
| 4,878,086 A | * 10/1989 | Isohata et al. | 355/77 |
| 5,301,013 A | * 4/1994 | Meijer et al. | 356/400 |
| 5,786,704 A | * 7/1998 | Kim | 324/765 |
| 5,801,545 A | * 9/1998 | Takekoshi et al. | 324/770 |
| 5,812,271 A | * 9/1998 | Kim | 356/401 |
| 6,089,635 A | * 7/2000 | Lee | 294/88 |
| 6,152,755 A | * 11/2000 | Lee | 439/327 |

FOREIGN PATENT DOCUMENTS

DE   19-615919 A1   * 10/1996

* cited by examiner

Primary Examiner—William L. Sikes
Assistant Examiner—Tarifur R. Chowdhury
(74) Attorney, Agent, or Firm—Marshall, Gerstein & Borun

(57) ABSTRACT

An LCD handler is disclosed. The LCD handler includes a body having a test site for testing an LCD panel and feeding/recovering sites on both sides of the test site for feeding and recovering the LCD panel. It also includes a pre-aligner in the body for mechanically aligning the LCD panel and feeding the aligned LCD panel to the feeding/recovering site. The handler also includes a carrier for carrying the LCD panel fed to the feeding/recovering site by the pre-aligner to the test site, and a driving mechanism for moving the carrier in a lateral direction of the body.

37 Claims, 22 Drawing Sheets

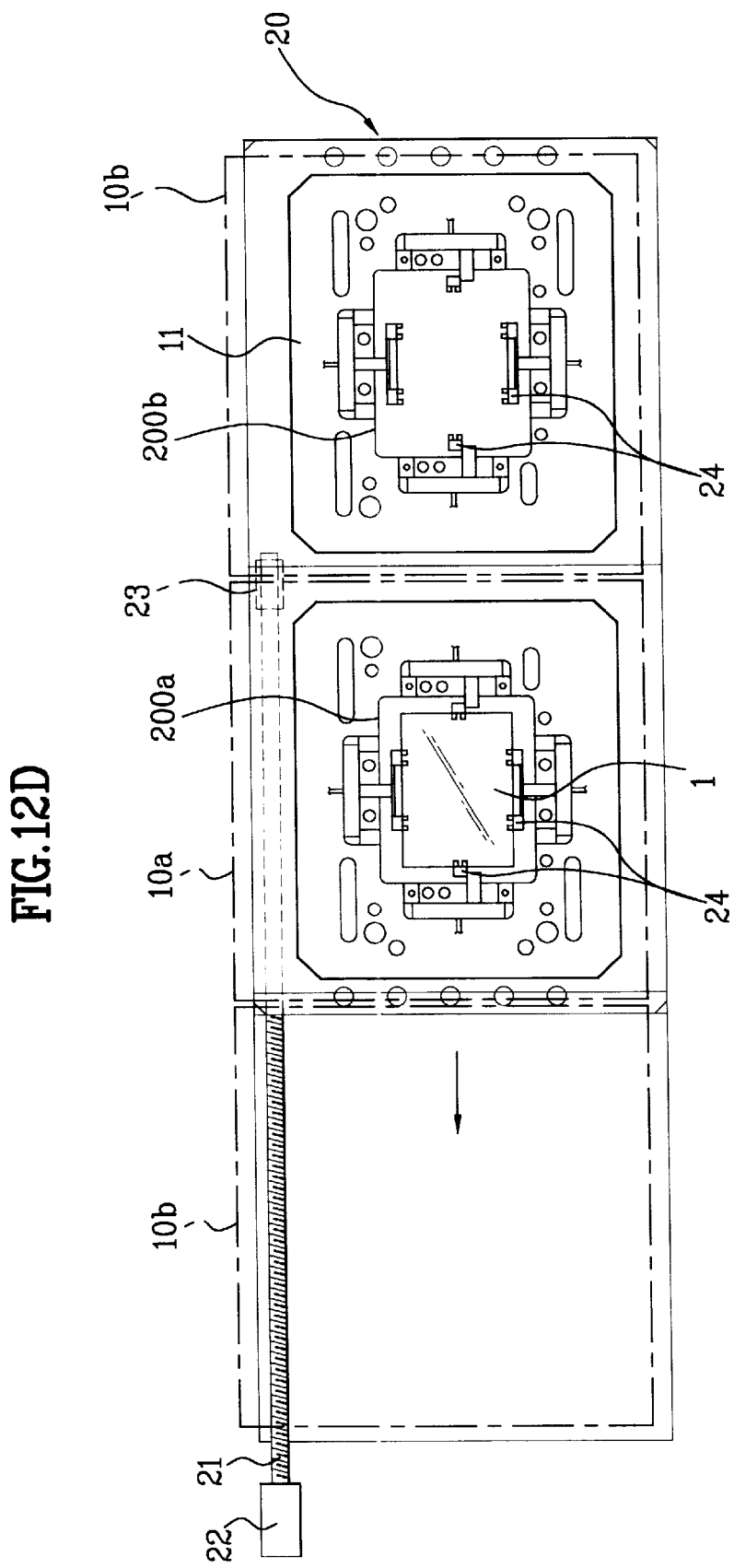

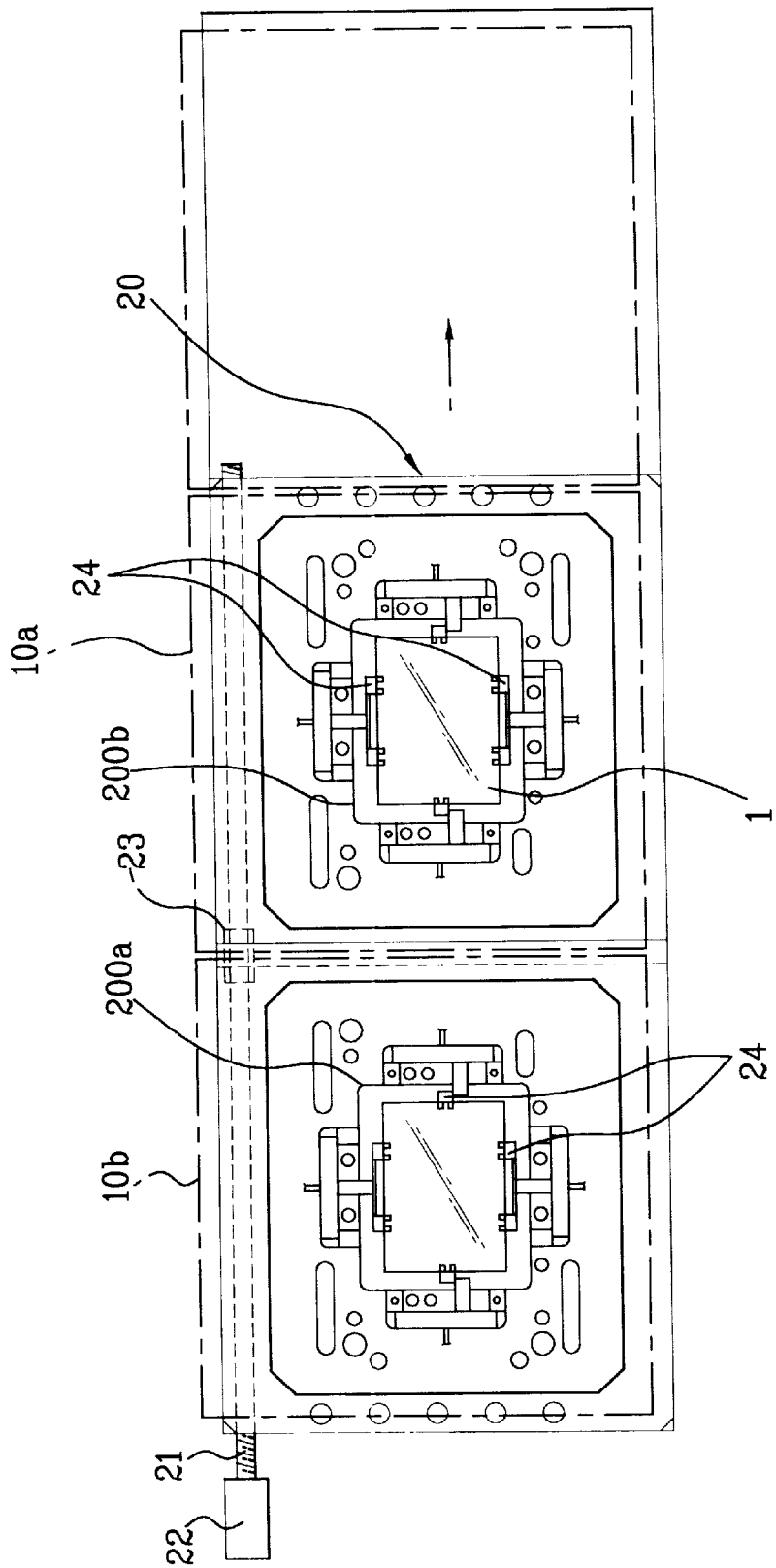

APPARATUS FOR TESTING AN LCD

BACKGROUND OF THE INVENTION

1. Field Of The Invention

The present invention relates to an LCD handler for testing an LCD panel, and more particularly, to an LCD handler including a system for transferring an LCD panel from a cassette to a test site, and a system for pre-aligning the LCD panel during a transfer process.

2. Background of the Related Art

The LCD handler automatically transfers the LCD panels to a test site for testing the LCD panels to determine if they are defective or not, and sorts and stacks the LCD panels in respective cassettes as "good", "repair", and "reject" upon completion of the test. A system and operation of a related art LCD handler will be explained with reference to FIGS. 1 and 2.

Referring to FIGS. 1 and 2, the related art LCD handler is provided with: (1) a cassette 2 for storing the LCD panels passed through the test and the LCD panels to be tested, in separate parts thereof; (2) a transfer robot 8 either for picking up the LCD panel to be tested from the cassette, or for inserting the LCD panel passed through the test into a slot (a storage space), in the cassette 2; (3) a test site 3 for testing the LCD panel transferred from the cassette by the transfer robot for defects; and (4) a transfer board 7 adapted to move between the transfer robot 8 and the test site 3 either for delivering the LCD panel passed through the test at the test site to the transfer robot 8 or for receiving the LCD panel to be tested from the transfer robot 8 and delivering the LCD panel to the test site 3. Particularly, the test site 3 is mounted oil a body 4 of the LCD handler to face forward, and there are first and second aligners 5 and 6 mounted on both sides of the body 4 to permit lateral movement to respective test sites for pre-aligning the LCD panel for loading the LCD panel to an exact test position.

Upon receiving the LCD panel to be tested from inside of the cassette 2 transferred in a horizontal direction by the transfer robot 8, the transfer board 7 takes the LCD panel, rises up to a top dead point where the first aligner 5 is disposed, rotates in conformity with a slope of the first aligner 5, and places the LCD panel on the first aligner 5. Then, the first aligner 5 aligns the LCD panel by using a visual camera 9 mounted to the first aligner 5. That is, the first aligner 5 aligns the LCD panel by comparing coordinates of an align mark in the LCD panel read by the visual camera 9 to preset coordinates. Upon completion of the alignment of the LCD panel at the first aligner 5, the first aligner 5 moves in a horizontal direction toward the test site 3, with the LCD panel mounted thereon. When the LCD panel arrives in front of the test site 3, the LCD panel is electrically connected to a signal applying part (not shown) in the test site 3, to conduct electrical test(s) of the LCD panel. If there is a tested LCD panel on the second aligner 6 while the LCD panel loaded to the test site by the first aligner 5 is being tested, the second aligner 6 moves away from the test site 3 to a standby position on the right side of FIG. 1, passes the tested LCD panel to the transfer robot 8, so that the transfer robot 8 transfers the LCD panel to an appropriate cassette 2 selected based on the result of the test conducted earlier at the test site 3. Then, the second aligner 6 aligns a new LCD panel supplied by the transfer robot 8, and stands by until testing of the LCD panel on the first aligner 5 is finished. When the first aligner 5 moves in a left direction in FIG. 1 after the LCD panel on the first aligner 5 is tested, the second aligner 6 moves to the test site for testing the new LCD panel on the second aligner. And, as explained before, while the LCD panel on the second aligner 6 is being tested at the test site 3, the tested LCD panel is unloaded from the first aligner 5 by the transfer robot, and loaded onto an appropriate cassette based upon the result of the earlier conducted test. Subsequently, the first aligner 5 receives a new LCD panel from the transfer robot 8, aligns the new LCD panel, and, after the alignment is complete, the first aligner 5 stands by until testing of the LCD panel on the second aligner 6 is finished. The related art LCD handler conducts the foregoing operation repeatedly until testing is complete.

The related art LCD handler has the following problems caused by structural characteristics of the LCD) handler. The expensive visual cameras 3 on the first and second aligners 5, 6 of the related art LCD handler renders the LCD handler expensive. Additionally, the alternating movements of the bulky and heavy first and second aligners 5, 6 in the loading of the LCD panels to the test site so as to connect the LCD panel to the signal applying part in the test site consumes a large amount of power. Moreover, the complicated system required for moving the first and second aligners 5, 6 renders the entire system of the LCD handler complicated, deteriorates the accuracy of the operation, causes a high frequency of troubles, and deteriorates the reliability of the handler. That is, the large sized first and second aligners 5, 6 require a high power for transferring the first and second aligners 5, 6, and the complicated system for moving the aligners 5, 6 reduces device operation accuracy, which increases the frequency of problems, and prolongs repair time. Furthermore, the space required for lateral movement of the aligners is large.

SUMMARY OF THE INVENTION

In accordance with an aspect of the invention, an LCD handler is disclosed which includes a body having a test site for testing an LCD panel; feeding/recovering sites on both sides of the test site for feeding and recovering the LCD panel; a pre-aligner in the body for aligning the LCD panel and feeding the aligned LCD panel to the feeding/recovering site after alignment of the LCD panel; a carrier for carrying the LCD panel fed to the feeding/recovering site by the pre-aligner to the test site; and driving means for moving the carrier in a lateral direction of the body.

BRIEF DESCRIPTION OF THE DRAWINGS

The accompanying drawings, which are included to provide a further understanding of the invention and are incorporated in and constitute a part of this specification, illustrate exemplary apparatus constructed in accordance with the teachings of the invention and, together with the description, serve to explain the principles of the invention.

FIGS. 7A and 7B illustrate an alignment operation of the positioning mechanism in FIG. 5, wherein, FIG. 7A illustrates a section before alignment of the LCD panel, and FIG. 7B illustrates a section after alignment of the LCD panel.

FIGS. 10A–10D illustrate the steps of a pre-aligning operation, wherein FIG. 10A is a side view showing the LCD panel set on the positioning mechanism; FIG. 10B is a side view showing the LCD panel aligned by the positioning mechanism; FIG. 10C is a side view showing the pre-aligner rotated by a preset angle; and FIG. 10D is a side view showing the pre-aligner elevated.

FIGS. 12A–12E illustrate the operation steps of the carrier of FIG. 3, wherein FIG. 12A illustrates a state in which a right carrier is positioned at the test site for testing the LCD panel, and a new LCD panel is not yet loaded on a left carrier; FIG. 12B illustrates a state after a new LCD panel is loaded on the left carrier; FIG. 12C illustrates a state after the carrier is moved to a right side of a body since test of the LCD panel on the right carrier is finished; FIG. 12D illustrates a state after the tested LCD panel on the right carrier is unloaded while the left carrier is positioned at the test site for testing the LCD panel; FIG. 12E illustrates a state after a new LCD panel is loaded on the right carrier; and FIG. 12F illustrates a state after the left carrier is moved to a left side of the body as test of the LCD panel positioned on the left carrier is finished.

FIGS. 14A–14B illustrate sections of preferred positioning mechanism constructed in accordance with the teachings of the present invention, wherein, FIG. 14A illustrates a section showing a state before the LCD panel is aligned; and FIG. 14B illustrates a section showing a state after the LCD panel is aligned.

DETAILED DESCRIPTION OF THE PREFERRED EMBODIMENT

Figure 3:
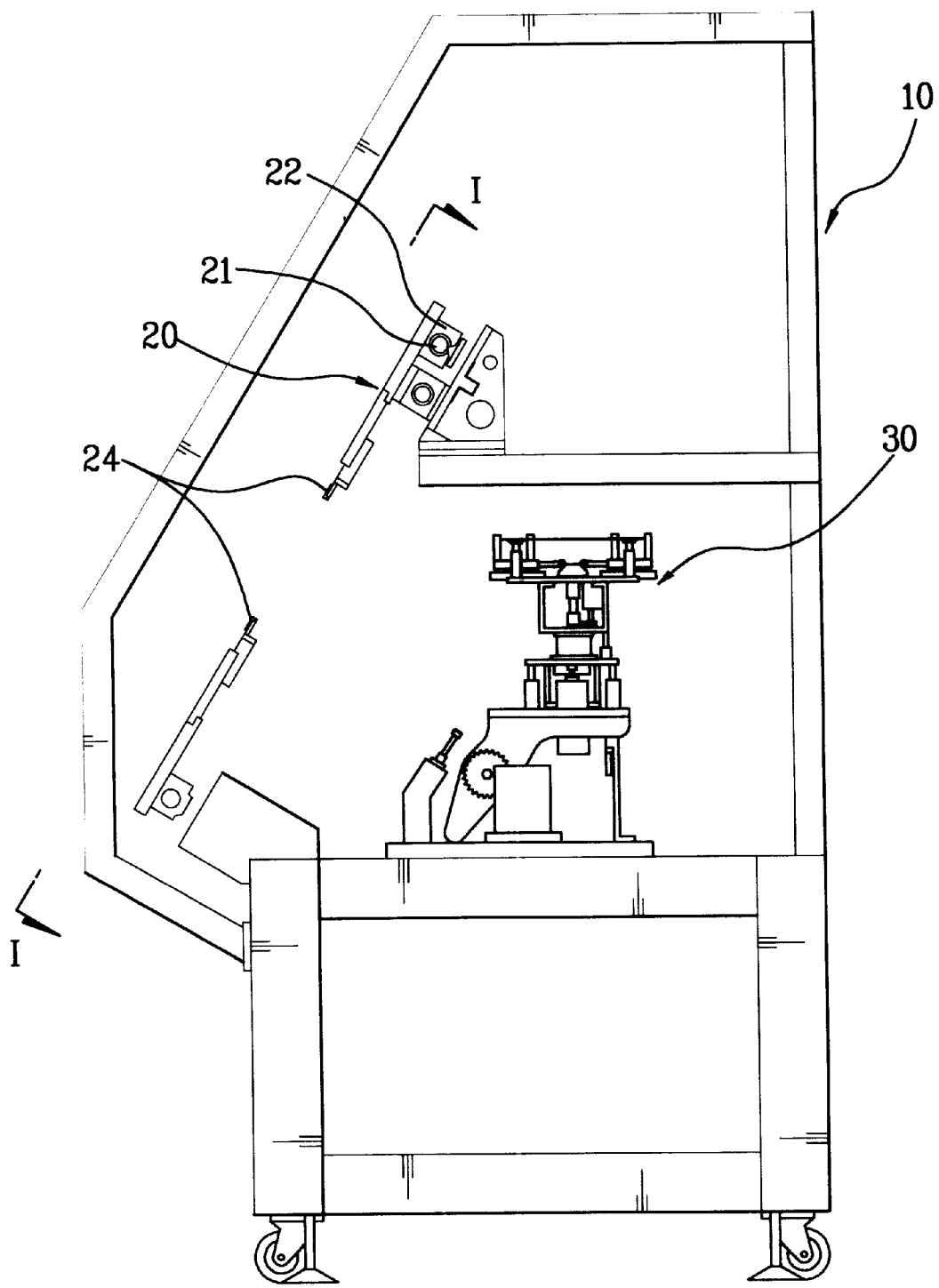
FIG. 3 is a side sectional view of a preferred LCD handler constructed in accordance with the teachings of the present invention.

Reference will now be made in detail to preferred examples of apparatus constructed in accordance with the teachings of the present invention. A preferred LCD handler constructed in accordance with the teachings of the present invention is shown in FIGS. 3 and 4.

Figure 4:
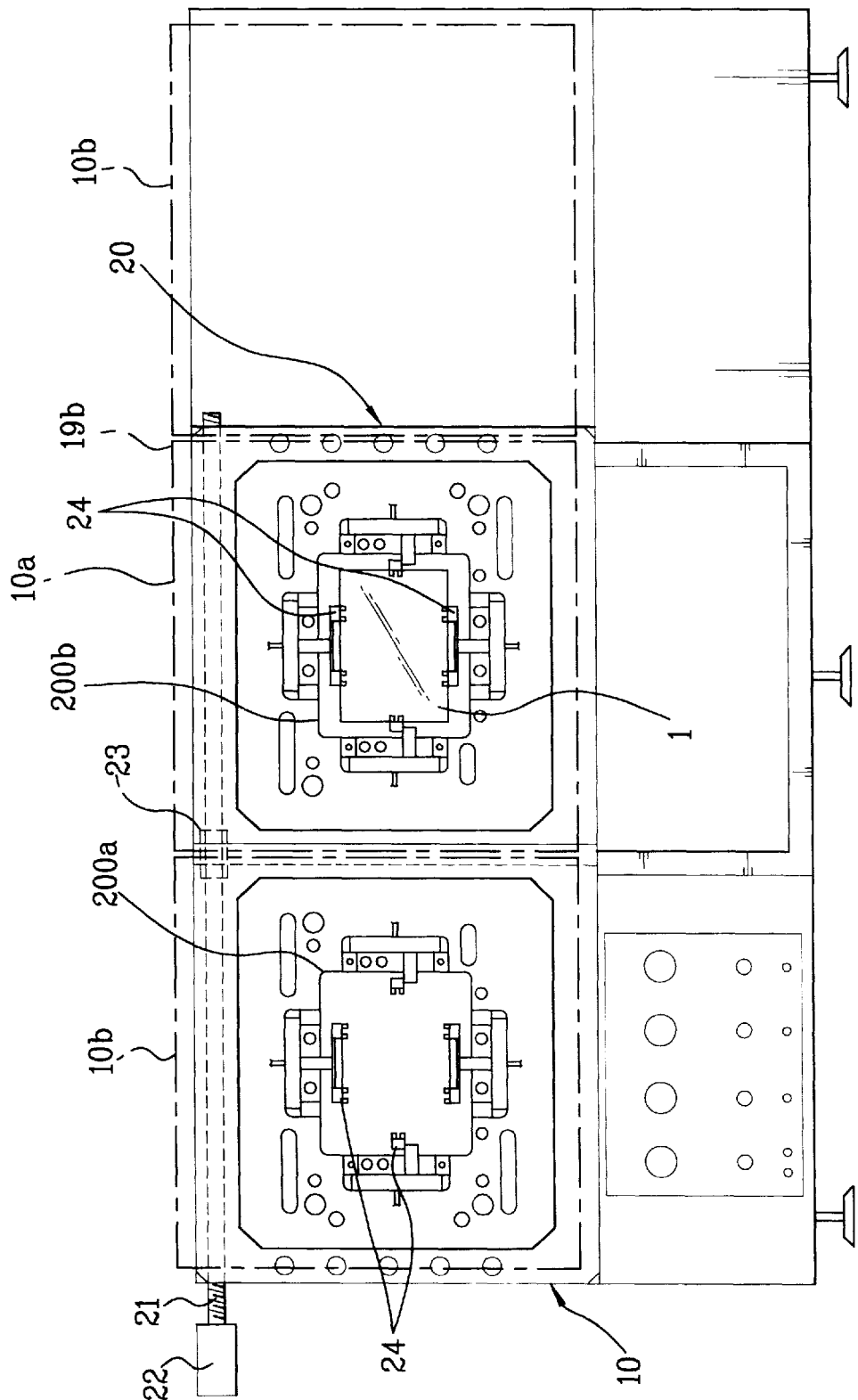
FIG. 4 illustrates a frontal section of the LCD handler of FIG. 3 across line I—I in FIG. 3.
Figure 5:
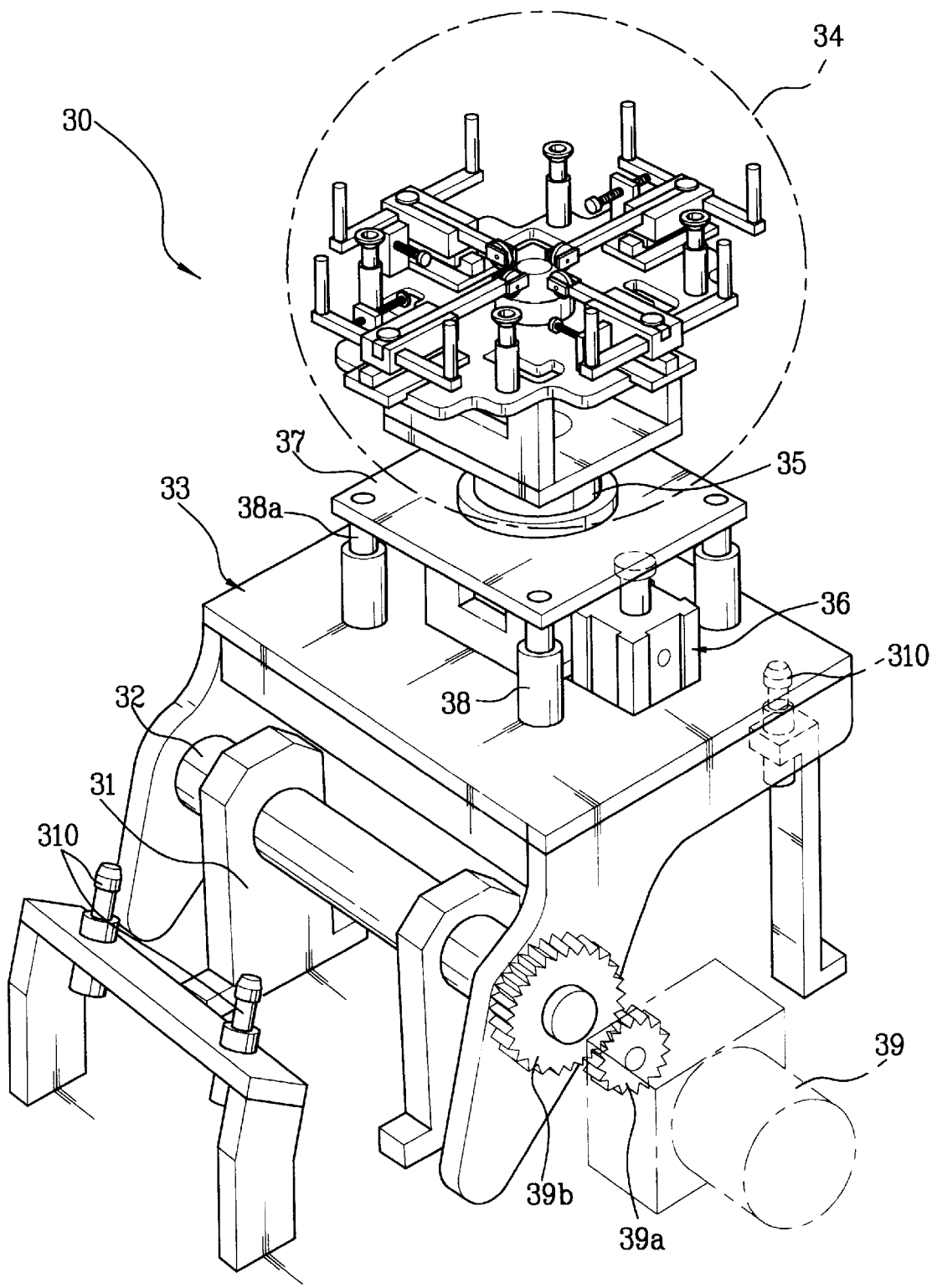
FIG. 5 is a perspective view of the pre-aligner in FIG. 3.
Figure 6:
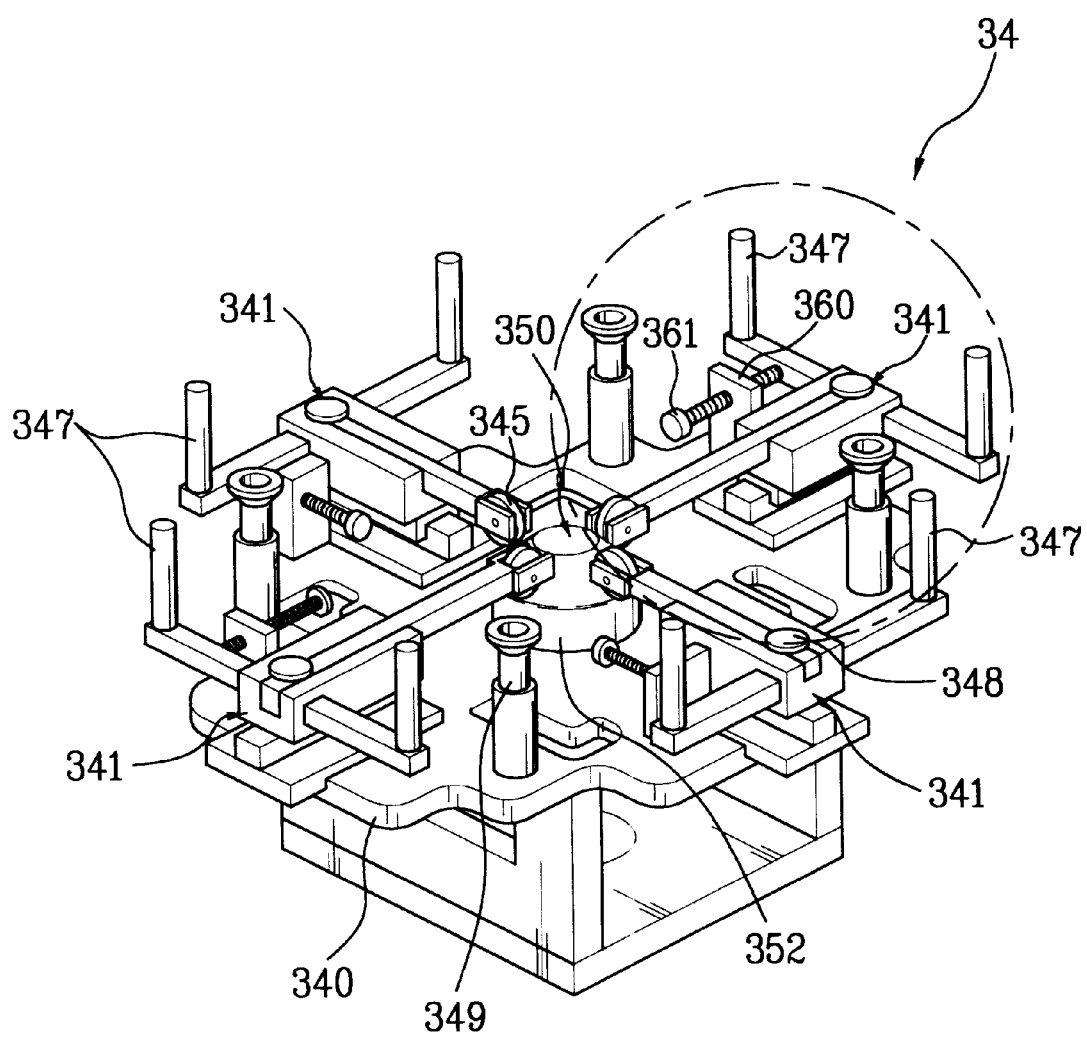
FIG. 6 is an enlarged perspective view of the positioning mechanism in FIG. 5.

Referring to FIG. 4, the LCD handler includes a test site 10a at a front center of a body 10, and feeding /recovering sites 10b on both sides of the test site 10a for acting as openings for feeding and recovering LCD panels. It also includes carriers 20 mounted in front of the test site 10a and the feeding recovering sites 10b for movement in a lateral direction of the body 10. Each carrier 20 is adapted for fastening the LCD panels 1 fed in succession through the feeding/recovering sites 10b. In this instance, the carriers 20 are given a lateral transfer force by driving means mounted on the body 10, which includes a screw shaft 21 connected to the carriers 20, a ball screw block 23 on the screw shaft 21, and a motor 22 for rotating the screw shaft 21 in regular/reverse directions. As the screw shaft 21 is rotated in the regular/reverse directions by the motor 22, the carriers 20 (which are coupled to the ball screw block 23 which moves along the screw shaft 21), move in a straight line along the screw shaft 21, together with the ball screw block. The carrier 20 is a flat plate, tilted by an angle with respect to a vertical plane in a side view. The flat plate inclusive of holding holes 200a and 200b is larger than an LCD panel 1 on both sides thereof in a front view. The carrier 20 includes a finger 24 on each side of the holding holes 200a and 200b. The fingers 24 are movable to forward or backward by driving means (not shown) for supporting respective sides of the LCD panel 1. Although the driving means for the fingers is preferably implemented by a hydraulic or pneumatic cylinder, the driving means is not limited thereto, but instead any other means which can make the same action can be used in this role. For example, a driving gear can be connected to a step motor, and a follow gear, the teeth of which are matched with teeth of the driving gear, can be fitted to the finger 24, so that rotation of the two engaged gears by the regular/reverse rotation of the step motor causes the desired forward or backward movement of the finger 24. The illustrated finger 24 has slots at an end thereof for stable holding of the LCD panel 1, but other approaches to securing the panel can be employed (for example, a vacuum holding system may also be applicable).

A pre-aligner 30 constructed in accordance with the teachings of the present invention is provided in the body 10 for aligning the LCD panel by means of a mechanical operation. Though for simplicity of illustration there is only one pre-aligner 30 shown in FIG. 3, there is actually a second pre-aligner located in a direction vertical to the drawing. The pre-aligners 30 are positioned at the feeding/recovering sites 10b in the body 10. An exemplary pre-aligner for the illustrated LCD handler will now be explained in detail, with reference to FIGS. 5~10D.

Figure 10A:
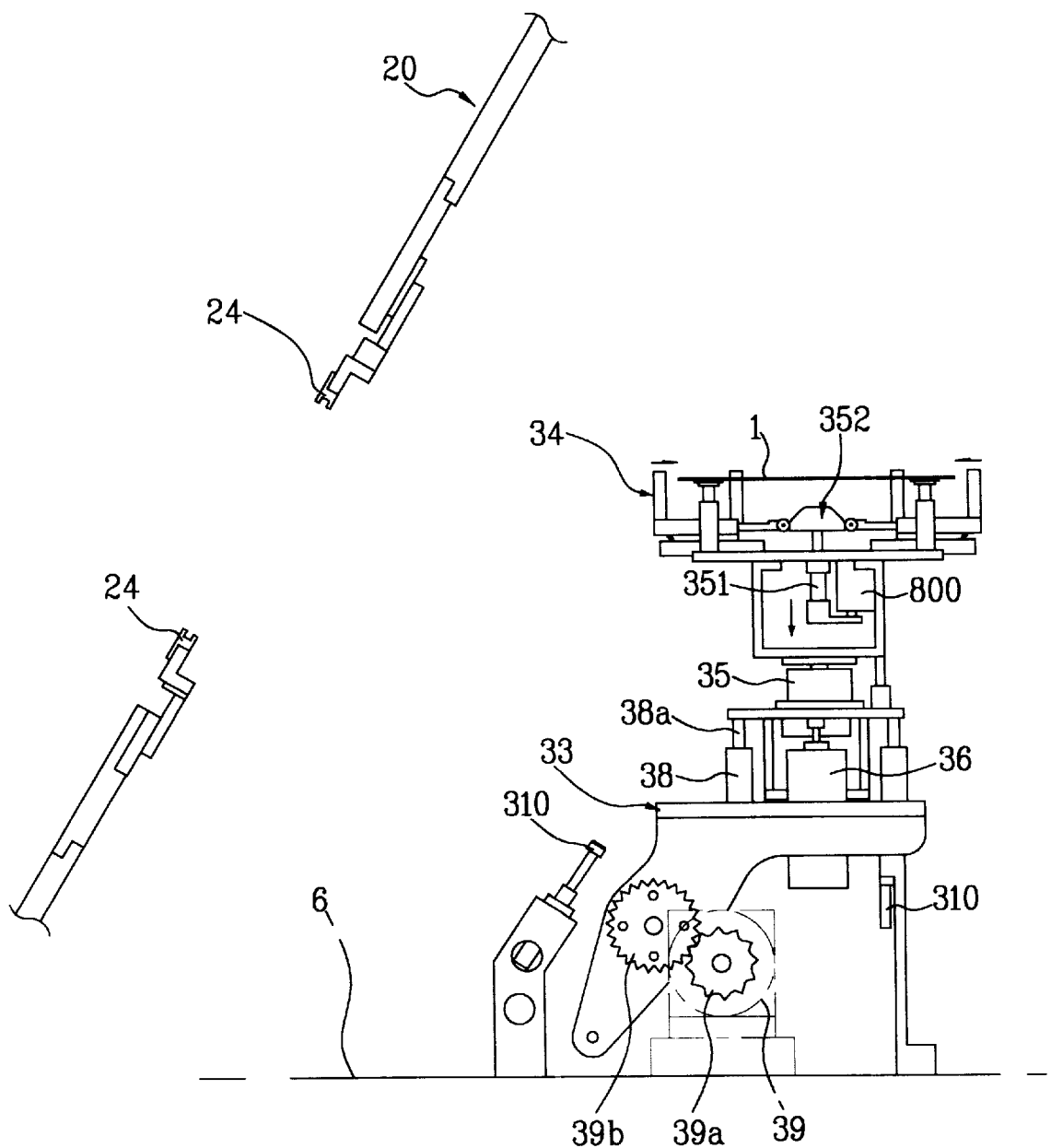

The pre-aligner 30 has a frame 33 which is rotatable around a shaft 32 that is passed through mount brackets 31 fixed to a base 6 (see FIG. 10A). It also includes a positioning mechanism 34 which is fixed to the frame 33 for aligning the LCD panel 1 transferred from a cassette (not shown) by a robot (not shown), LCD panel feeding means, and supporting the aligned LCD panel 1, and driving means for rotating the positioning mechanism by 90° in a horizontal state to change a position of the LCD panel 1. In this instance, though the driving means is preferably implemented by a step motor mounted on an elevating plate 37 over the frame 33 for rotating the positioning mechanism in regular/reverse directions by pulses, the driving means is not so limited, but instead, other mechanisms can be used in this role. There is a cylinder 36 on the frame 33 for elevating the positioning mechanism 34 with reference to a top surface of the frame 33, and a plurality of guides 38 on the frame 33 for guiding the elevation of the positioning mechanism, with a guide bar 38a in each of the guides 38. There is an elevating plate 37 fixed to the top of the plurality of guide bars 38a, and a step motor on the elevating plate 37 for rotating the positioning mechanism 34 by 90° in a horizontal state. In this instance, an appropriate friction is provided between the guide 38 and the guide bar 38a for preventing a sudden movement of the guide bar 38a. And, there is rotating means between the base 6 and the frame 33 for rotating the entire pre-aligner 30 toward a front direction of the body around the shaft 32 by a preset angle (60° in the illustrated embodiment). The rotating means comprises a geared motor 39 mounted on the base 6, a driving gear 39a directly engaged with the geared motor, and a spur gear 39b coupled to an end of the shaft 32 passed through a lower portion of the frame 33 and engaged with the driving gear 39a.

When the pre-aligner 30 is rotated in the front direction (in the one dot chain line direction), though a stop position of the rotation is fixed by self-control of the rotating means, the rotating means may over run from malfunction and inertia. Since the LCD panel 1 may be broken by the impact of a sudden stop, in order to prevent such occasion, stoppers 310 are mounted on the base 6 in front and rear of the pre-aligner 30 for limiting rotation angles of the pre-aligner 30 as the stoppers 310 are brought into contact with the frame 33. The positioning mechanism 34 has a flat base plate 340 as a base surface (unnecessary portions are preferably removed from plate 340 for reduction of weight), and an aligning member 341 mounted on each side of the base plate 340 for movement in a center direction of the base plate 340. In this instance, a slider 344 in the aligning member 341 is connected to a return spring 342 elastically with respect to the base plate 340, for continuously applying a restoring force toward a center of the base plate 340 (see FIG. 6).

Figure 9:
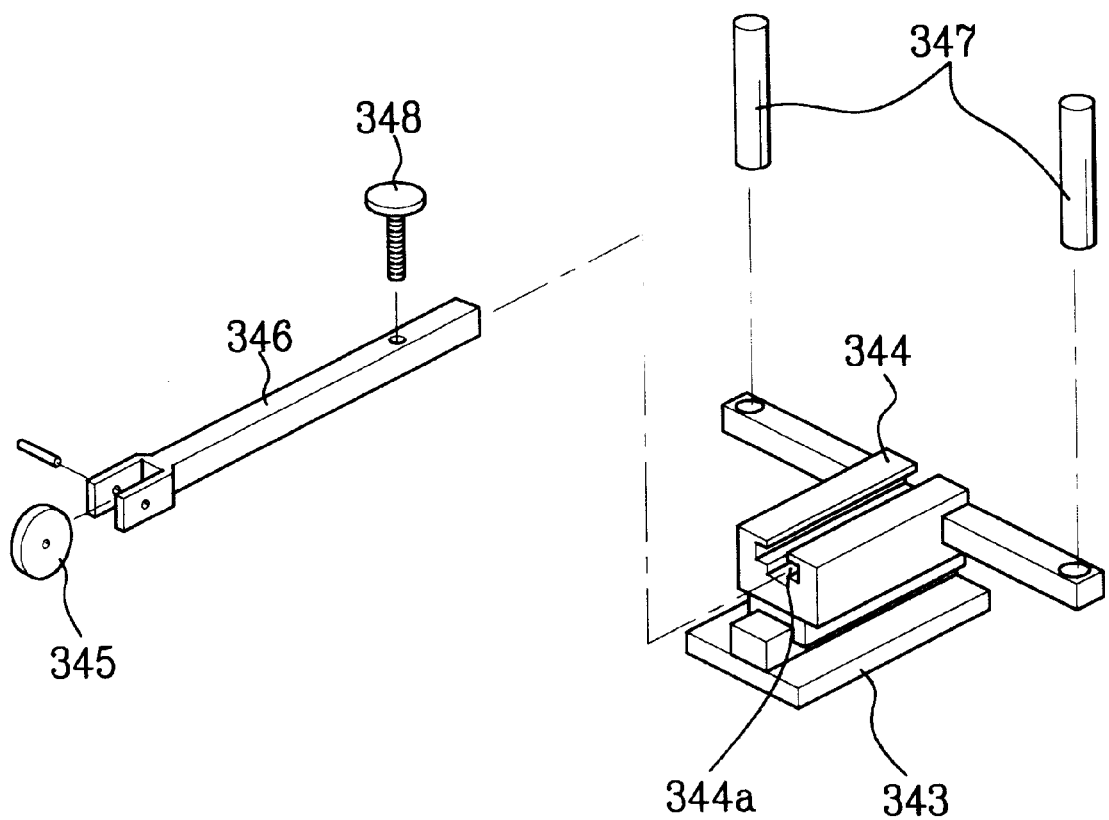
FIG. 9 is a perspective view of the align member in FIG. 8.

Referring to FIG. 9, the aligning member 341 includes a guide rail 343 fixed to an upper surface edge of each side of the base plate 340. The aligning member 341 also includes a slider 344 which is movable along the guide rail 343, and a roller rod 346 coupled to the slider 344 to permit position correction. The roller rod 346 has a roller 345 at an inside end thereof. The alignment member 341 also includes vertical supporting bars 347 on both sides of the slider 344 for supporting a side of the LCD panel 1. The slider 344 and the roller rod 346 are coupled together by an adjusting knob 348, so that a position of the roller rod 346 is corrected or fixed appropriately with regard to the slider 344 as the adjusting knob 348 is loosened or fastened. That is, the guide rails 343 are fixed to sides of the base plate 340, the sliders 344 are fitted thereon to move along the guide rails 343, and the sliders 344 have longitudinal holding grooves 344a for inserting the roller rods 346 each with a roller 345 fitted at an inside end thereof along the holding grooves 344a. Since the supporting bars 347 support sides of the LCD panel 1, the LCD panel 1 may be damaged by the supporting bars 347 if the supporting bars are formed of a hard material. In order to prevent this problem, it is preferable that the supporting bars 347 be formed of an elastic material.

For mechanically moving the aligning members forward or backward, an up/down member 350 is provided in a space where the aligning members 341 come together. The up/down member 350 has an up/down rod 351 (see FIG. 7B) for making an up/down movement by means of a cylinder 800, driving means for exerting a driving force in up/down directions, and a guide cone 352 in the form of a cone fitted to a top of the up/down rod 351, so that the rollers 345 fitted to the aligning members 341 are brought into rolling contact with an outer circumference of the guide cone 352 when the up/down member 350 comes down, to permit the slider 344 to move forward according to a slope angle of the guide cone 352. There is a stopper 360 in an inner moving region of the aligning member 341 (see FIG. 6) for setting a stop position of the aligning member. The stopper 360 includes a supporting piece 361 and an adjusting screw 362 passed through the supporting piece 361 for screwing/unscrewing the adjusting screw 362 to limit an inward moving distance of the aligning member 341, for (this will be explained later again), varying a supporting position of the aligning member 341 according to an outside dimension of the LCD panel aligned to the aligning member 341. There are a plurality of fastening means on the base plate 340 for fastening the LCD panel 1 as the LCD panel 1 is aligned. In the illustrated apparatus, the fastening means comprises suction devices 349 for selectively fastening a bottom of the LCD panel 1 by means of vacuum.

The operation of the illustrated LCD handler will be explained with reference to FIGS. 3–12F. First, a process for positioning the LCD panel by the illustrated positioning mechanism will be explained, with reference to FIGS. 6~7B, 10A and 10B.

Figure 7A:
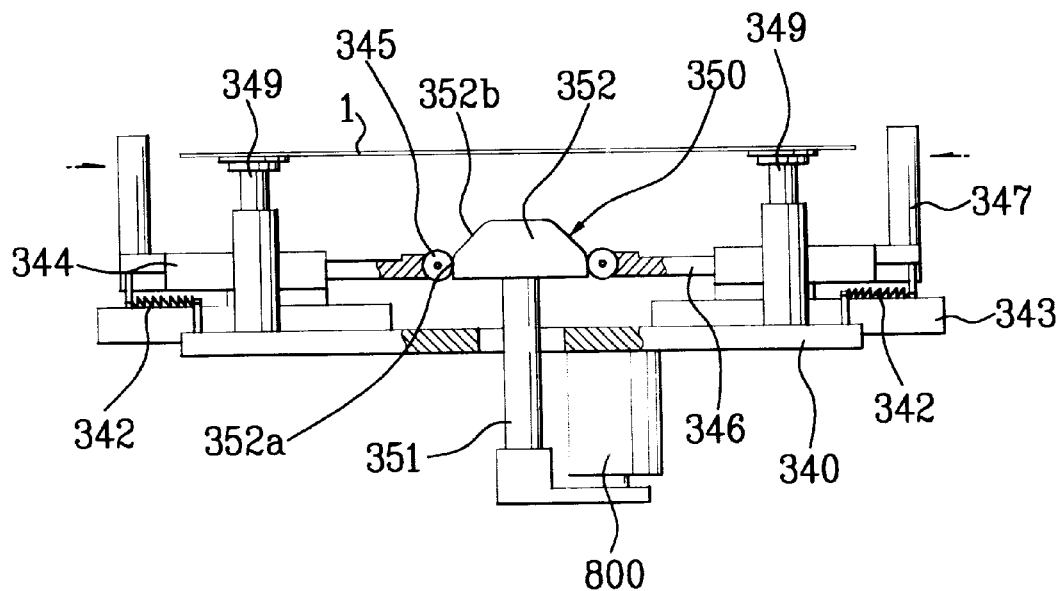
Figure 7B:
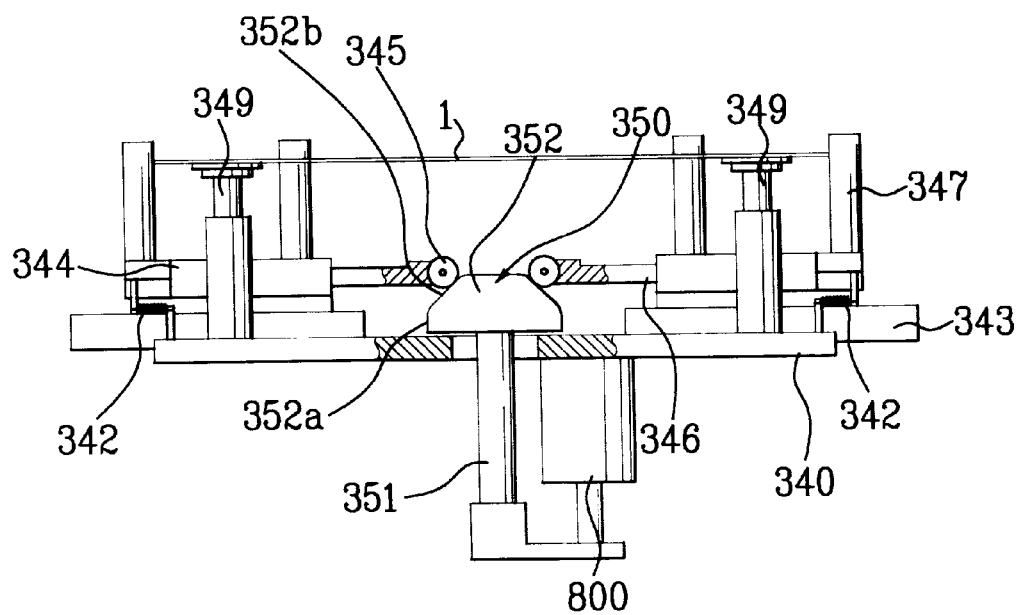
Figure 8:
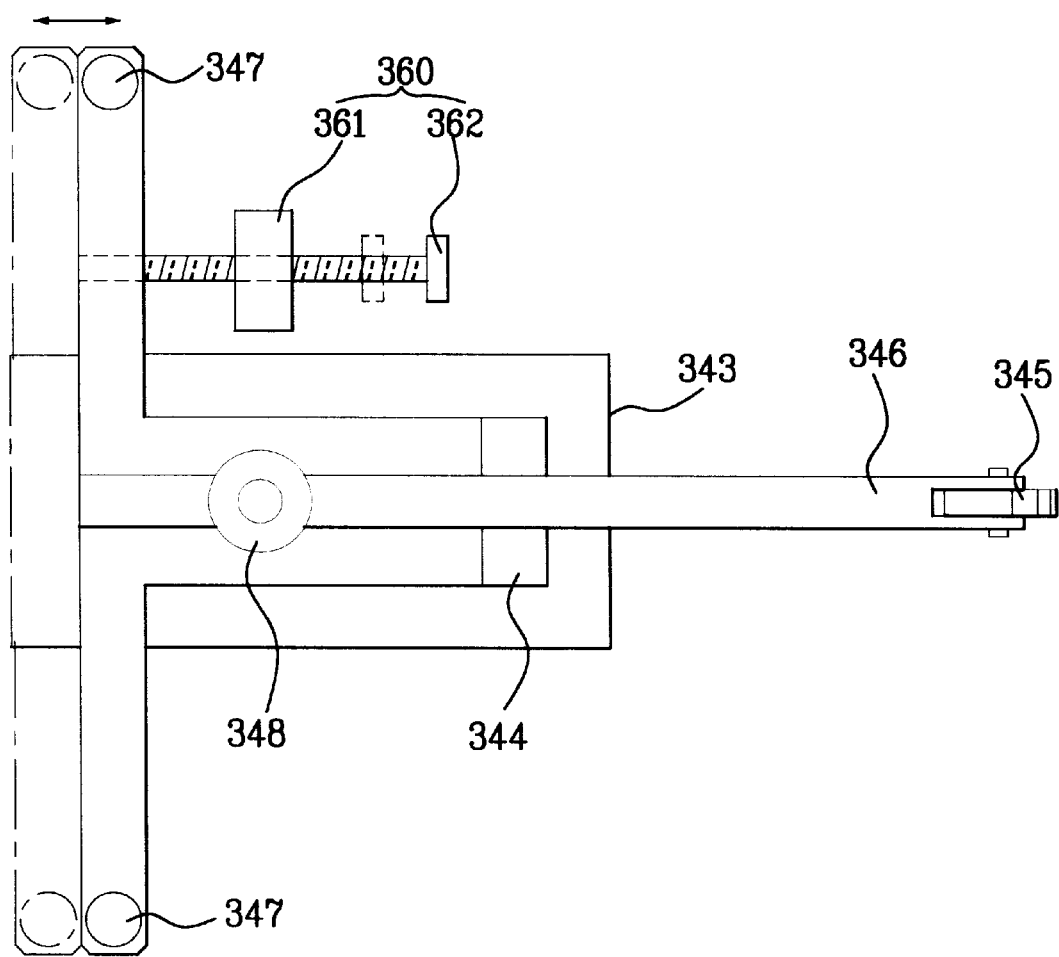
FIG. 8 is a plan view showing a step for correcting a stop position of an align member by a stopper.
Figure 10B:
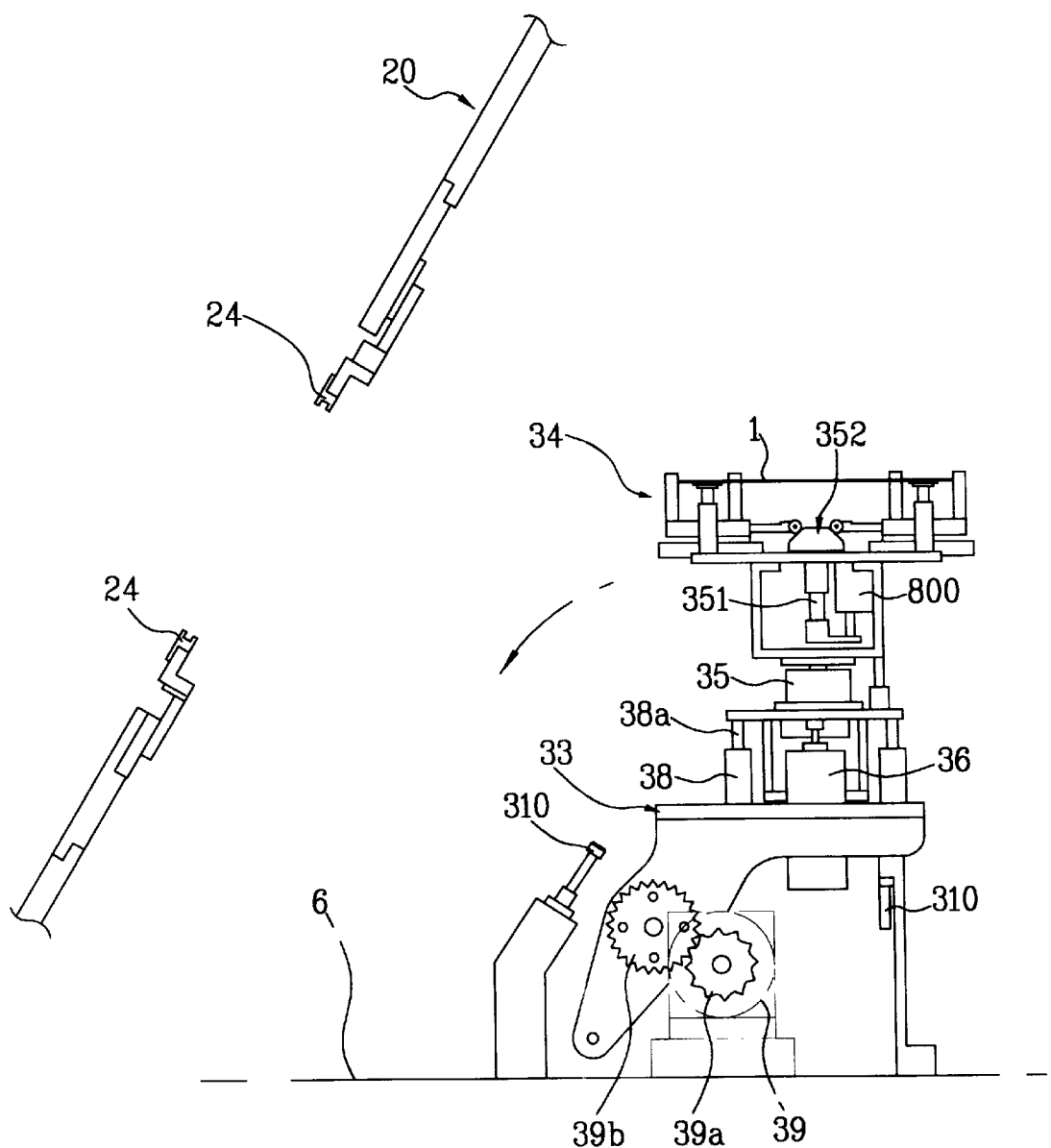
Figure 10C:
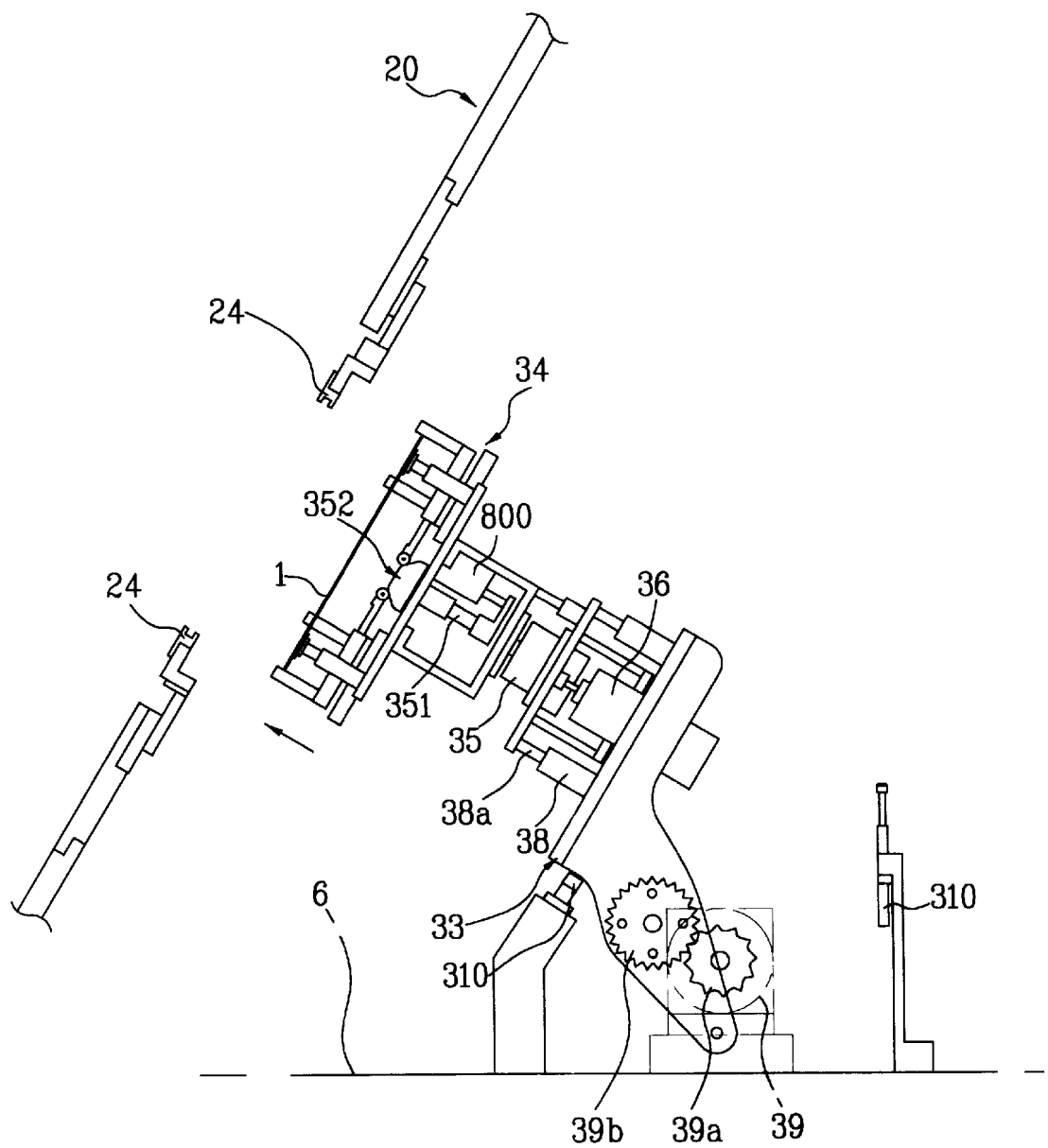
Figure 10D:
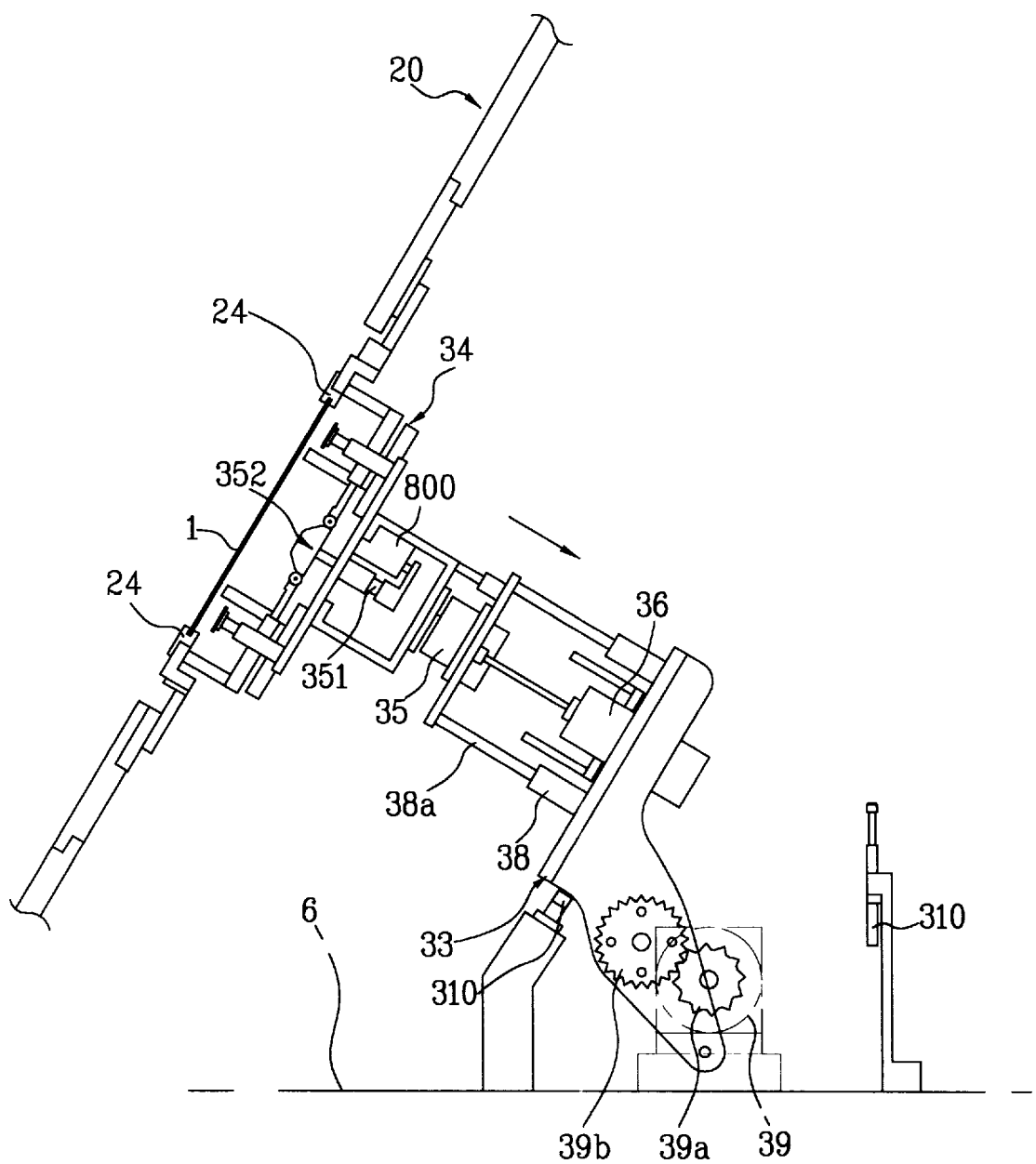

The up/down member 350 is at an elevated state until the LCD panel 1 is placed thereon. When the up/down member 350 is elevated by the cylinder 800, the roller rods 346 and the sliders 344 coupled three-to are at a retracted state (see FIGS. 7A and 10A), because the rollers 345 are in contact with a greatest outer circumference 352a, (e.g., a bottom dead point on the guide cone 352), where the aligning members 341 are away from each other to the maximum for receiving the LCD panel 1. As shown in FIGS. 7A and 10A, if the LCD panel to be tested is then transferred from the cassette to the positioning mechanism 34 by the robot, the positioning mechanism 34 aligns the LCD panel 1 as shown in FIGS. 7B and 10B. When the LCD panel 1 is placed between the aligning members 341 as shown in FIGS. 7A and 10A, the LCD panel 1 is in a state that the LCD panel 1 merely lies on the suction devices 349 projecting upward from the base plate 340. Then, upon lowering the up/down member 350 via the cylinder 800, the rollers 345 are brought into contact with a smaller outer circumference 352b, (e.g., a top dead point of the guide cone 352), and, at the same time, the roller rods 346 as well as the sliders 344 are advanced toward the center of the base plate 340 by the elastic force of the return springs 342. Simultaneously, the vertical supporting bars 347 on both sides of the slider 344 advance to push the sides of the LCD panel 1 to thereby align the LCD panel as shown in FIGS. 7B and 10B. Since the supporting bars 347 are formed of a soft material, even if the supporting bars 347 are brought into contact with the l,CD panel 1 strongly, the LCD panel 1 is not damaged. However, since there is a high possibility of damage of the LCD panel 1 if the elastic force of the return spring 342 is excessively great, the stopper 360 is provided for stopping the slider 344 at an appropriate point on an inner moving path of the aligning member 341, to prevent damage to the LCD panel. By screwing the adjusting screw 362 in the stopper 360, a length of the adjusting screw 362 can be varied for stopping the aligning member 341 at a desired position. Upon finishing alignment of the LCD panel 1 by the aligning members 341, the suction devices are activated to firmly fasten the aligned LCD panel 1 on the suction devices.

A process for feeding the LCD panel 1 to the feeding/recovering, site by using the pre-aligner after positioning the LCD panel at the positioning mechanism is completed will now be explained with reference to FIGS. 10A–10D.

After positioning of the LCD panel is completed through a state shown in FIG. 10A, the positioning mechanism 34 is rotated by 90°. That is, the positioning mechanism 34 is rotated by 90° by the step motor 35 so that the LCD panel 1 changes a direction from a state in which a short side of the LCD panel 1 faces forward to a state in which a long side of the LCD panel faces forward. Then, the geared motor 39 on the base 6 is driven to rotate the driving gear 39a directly coupled to the geared motor 39 in a clockwise direction on the drawing as shown in arrow in FIG. 10A, the spur gear 39b (which is engaged with the driving ear 39a and coupled to the shaft 32 passed through a lower portion of the frame 33) is rotated in a counterclockwise direction, to bring the pre-aligner 30 to a state such as that shown in FIG. 10C. The frame 33 rotates around the shaft 32 by 60° in a counterclockwise direction on the drawing, to a state in which the frame 33 is parallel with the carrier (LCD panel transfer means), positioned in front of the frame 33. In this instance, as explained above, though a rotation angle of the frame 33 is basically regulated by the geared motor 39, there is still a potential for over run by loss of the regulating function or an inertia of the frame. In order to prevent overrun, stoppers 310 are provided at points where the frame should stop so that the frame is brought into contact therewith, thereby mechanically reinforcing safety. The stopper 310 is sustained in a projected state by a pneumatic pressure until a sudden force is exerted thereon when the stopper 310 is pressed to act as a damper for preventing damage to the LCD panel in a process in which the frame 33 is rotated. That is, in the over run of the pre-aligner, an air damping action of the stopper 310 attenuates a rotation force of the pre-aligner caused by an inertia of the frame, thereby preventing damage to the LCD panel 1 which is supported on the positioning, mechanism 34.

As shown in FIG. 10I), right after the frame 33 is rotated, the cylinder 36 under the positioning, mechanism 34 is operated to cause the positioning mechanism 34 to advance toward the carrier, (i.e., an LCD panel transporting means). In this instance, the positioning mechanism 34 carries the 1LCD panel 1 to a position in which the fingers 24 on the carrier 20 holds the LCD panel 1. Thereafter, the LCD panel 1 is carried by the carrier 20 to the test site at a center of the body to perform an LCD panel testing process. Since the returning of the pre-aligner 30 to an original position follows a reverse of the foregoing process, a separate explanation will be omitted, except that, when the pre-aligner 30 is changed from a state tilted forward to a vertical state, the rotation angle of the pre-aligner 30 is basically regulated by the geared motor 39. However, since there is a potential of over run caused by a loss of a regulating function or by an inertia of the frame 33, another stopper 310 is provided at a point where the frame 33 is intended to stop, thereby enhancing the accuracy of the operation and preventing damage to the LCD panel.

With the alignment completed as described above, a process for loading the LCD panel to the test site through the feeding/recovering site by the carrier, and a process for unloading the LCD panel through the feeding/recovering site after being tested at the test site will be explained, mainly with reference to FIGS. 12A–12F.

Figure 12A:
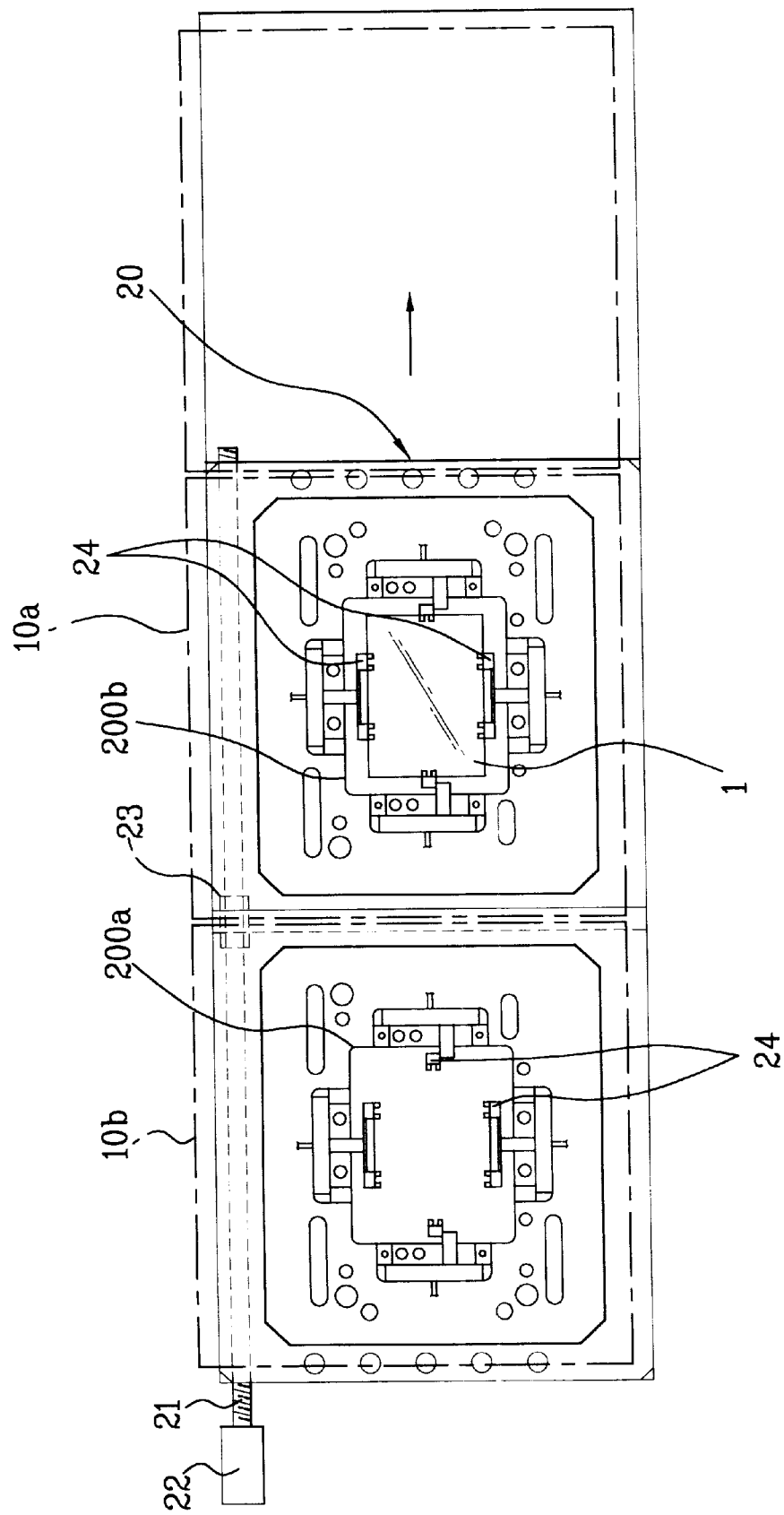
Figure 12B:
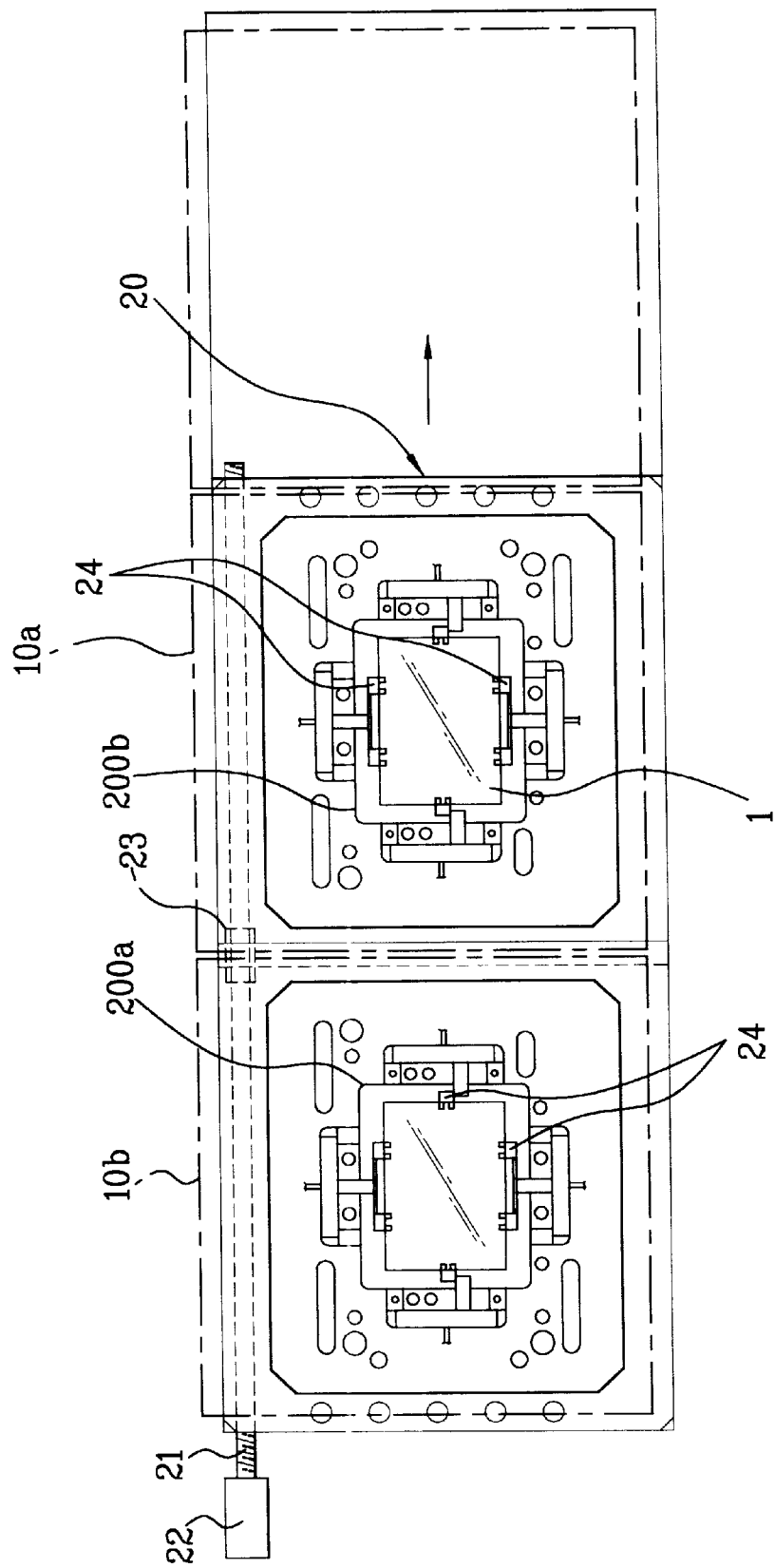
Figure 12C:
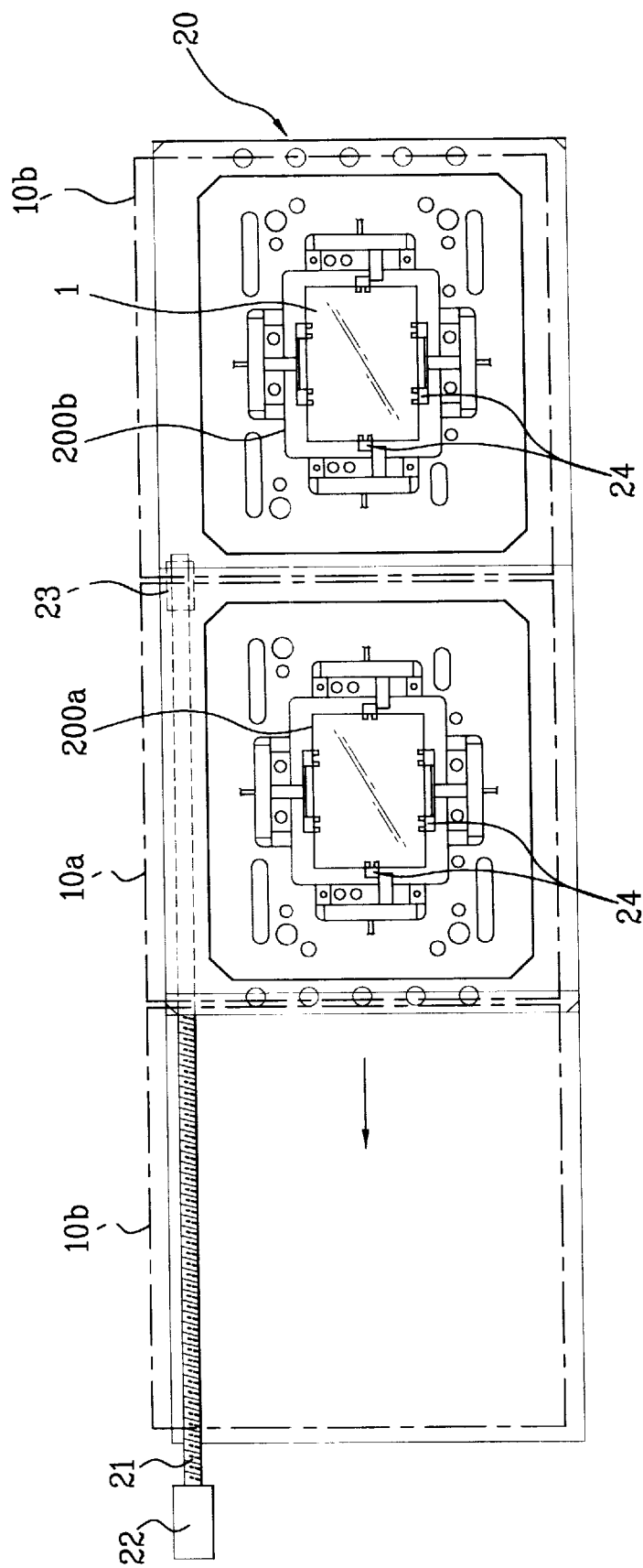

Referring to FIG. 12A, in the illustrated position of the two holding holes 200a and 200b of the carrier 20, the right side holding hole 200b having the LCD panel 1 held therein is positioned over the test site 10a and testing is underway. A new LCD panel should be fed through the left side holding hole 200a positioned at the feeding/recovering site 10b. That is, when one LCD panel is tested at the test site 10a, a new LCD panel should be fed through the feeding/recovering site 10b and held in a standby condition. To do this, when the new LCD panel is placed inside of the left side holding hole 200a by the pre-aligner 30 located at the rear of the left side holding hole 200a, the fingers 24 on the sides of the left holding hole 200a advance toward the sides of the LCD panel 1 until the fingers 24 hold the LCD panel 1 as shown in FIG. 12B. When testing of the LCD panel 1 held in the right side holding hole 200b is completed, the carrier 20 moves to a right side of the drawing to a state as shown in FIG. 12C by a transfer force given by driving means in the body 10. In this instance, the carrier 20 moves to a right side along the screw shaft 21 together with the ball screw 23 which moves along the screw shaft 21 as the screw shaft 21 rotates in a regular direction by the motor 22 because the carrier 20 is coupled with the ball screw 23.

As shown in FIG. 12C, the LCD panel held inside of the left side holding hole 200a of the carrier 20 is positioned at the test site 10a for testing, and, during the testing of the LCD panel held inside of the left side holding hole of the carrier, a tested LCD panel 1 held inside of the right side holding hole 200b at the feeding/recovering site 10b in a right side of the body 10 escapes through the feeding/recovering site 10b (see FIG. 12D). That is, the LCD panel 1 held inside of the right side holding hole 200b is carried to the pre-aligner 30 when the LCD panel is released from holding force as the fingers 24 are retracted. The panel is subsequently transferred to an appropriate cassette (not shown) by the pre-aligner 30 and the robot (not shown).

Figure 12E:
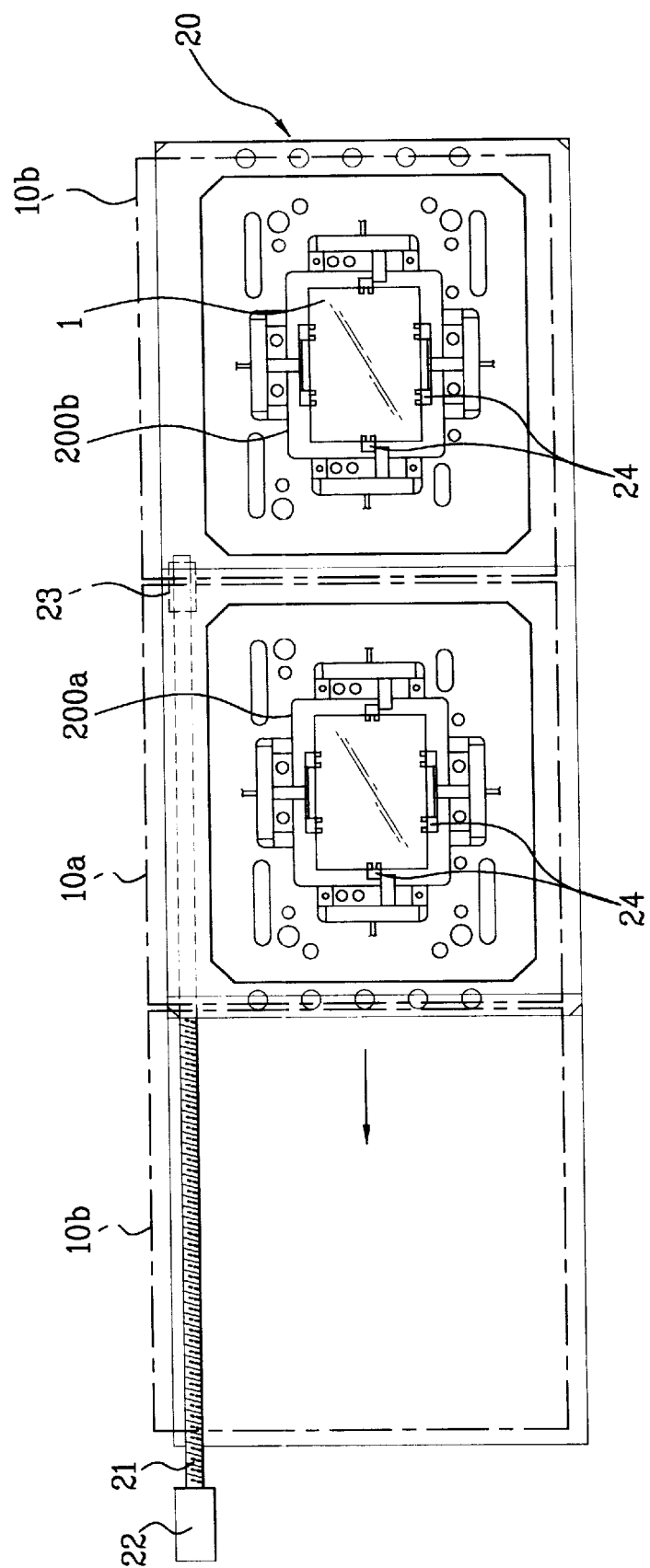

In the condition shown in FIG. 12D, a new LCD panel 1 aligned by the pre-aligner 30 is fed to the feeding/recovering site 10b in the right side of the body 10, and held inside of the right side holding hole 200b of the carrier 20 as shown in FIG. 12E. Thereafter, upon completion of testing for the LCD panel 1 held inside of the left side holding hole 200a, the carrier moves to a left side of the drawing as the carrier 20 receives a transfer force from the driving means in the body 10 as shown in FIG. 12F. Then, the tested LCD panel held inside of the left side holding hole 200a escapes through the feeding/recovering site in the left side of the body by action of the pre-aligner 30 and the robot, and is sorted according to a result of the test, and placed in an appropriate cassette. In continuation, a new LCD panel 1 is transferred by the action of the robot and the pre-aligner 30, and left in a standby state where the new LCD panel 1 is held inside of the left side holding hole 200b until testing of the LCD panel in the right side holding hole 200a is completed.

Figure 1:
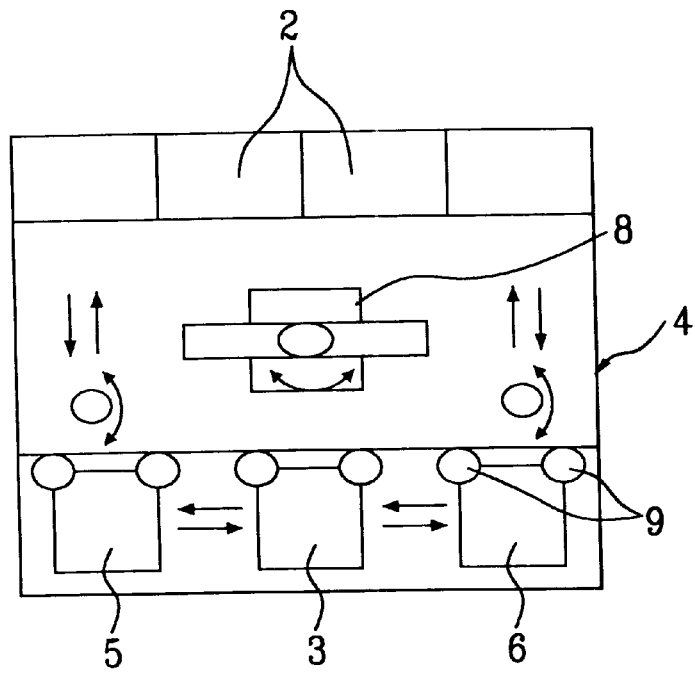
FIG. 1 schematically illustrates a related art LCD handler.
Figure 2:
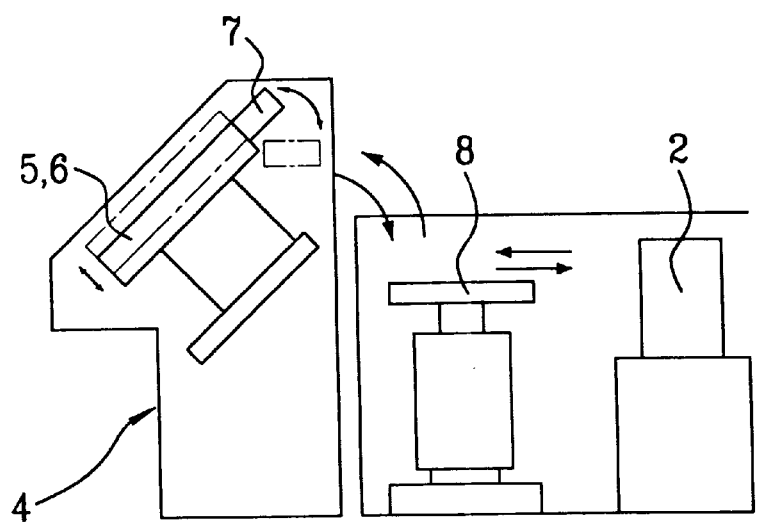
FIG. 2 is a side view of the related art LCD handler shown in FIG. 1.

The disclosed LCD handler repeats the steps of FIGS. 12A–12F, for loading an LCD panel to the test site, and unloading a tested LCD panel to the cassette. Accordingly, the overall system of the LCD handler is simplified relative to other handlers by pre-aligning an LCD panel before the LCD panel is transferred to the carrier 20 by using a mechanical pre-aligner 30, and transferring to the test site 10a by using the light and simple carrier 20 in place of the heavy and complicated aligners 5, 6 mounted on both sides of test sites 3 shown in FIGS. 1 and 2.

Figure 11:
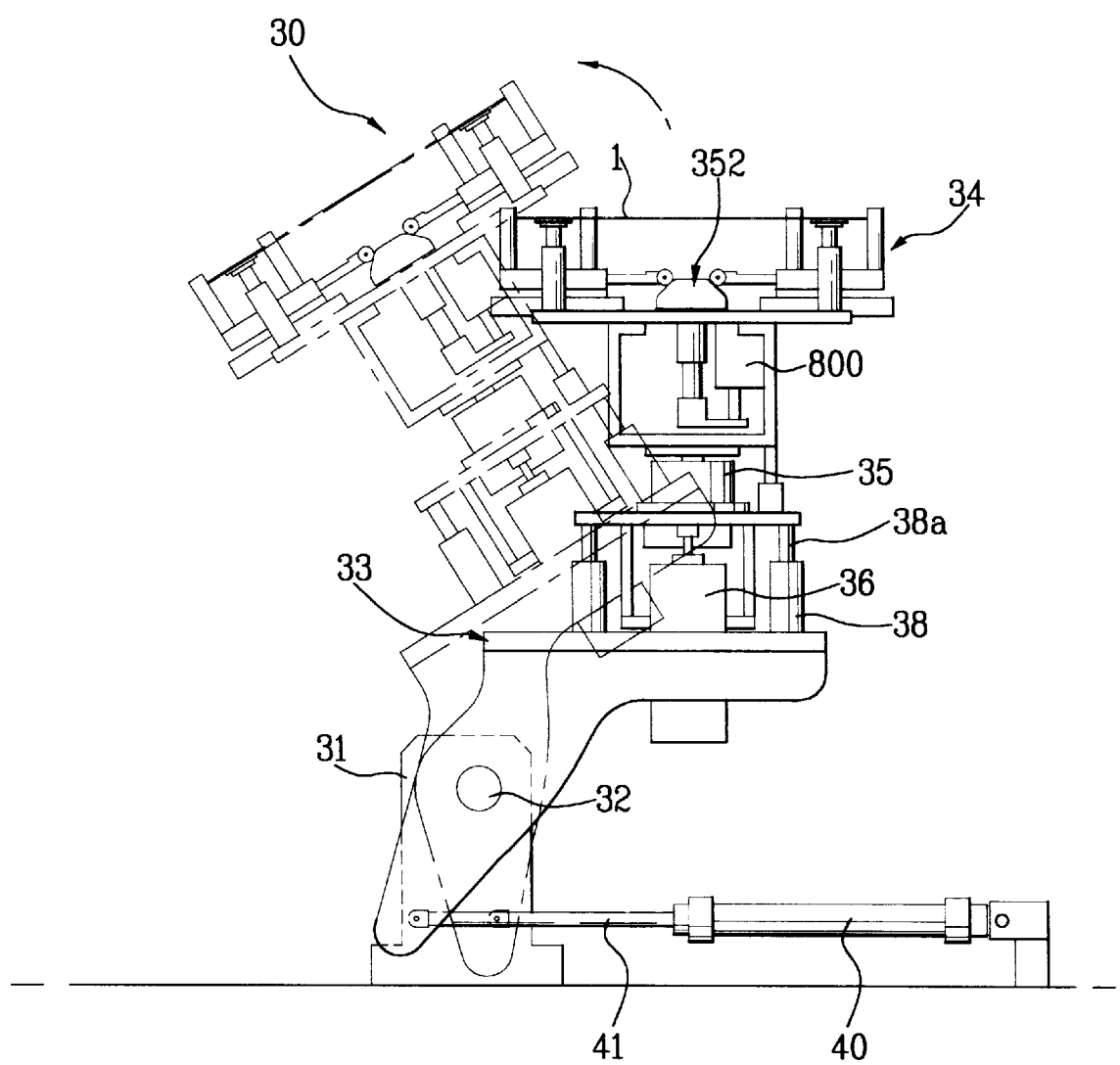
FIG. 11 illustrates another pre-aligner rotating means in the pre-aligner.

FIG. 11 illustrates another pre-aligner rotating means constructed in accordance with the teachings of the invention for use in the pre-aligner 30. The rotating means of FIG. 11 includes a cylinder 40 on a top surface of the base 6. An end of the plunger 41 of the cylinder 40 is coupled with a lower end of the frame 33 for rotating the pre-aligner 30 in clockwise and counterclockwise directions around the shaft 32 passed through the mount bracket 31 as the plunger 41 advances and retracts.

Figure 13:
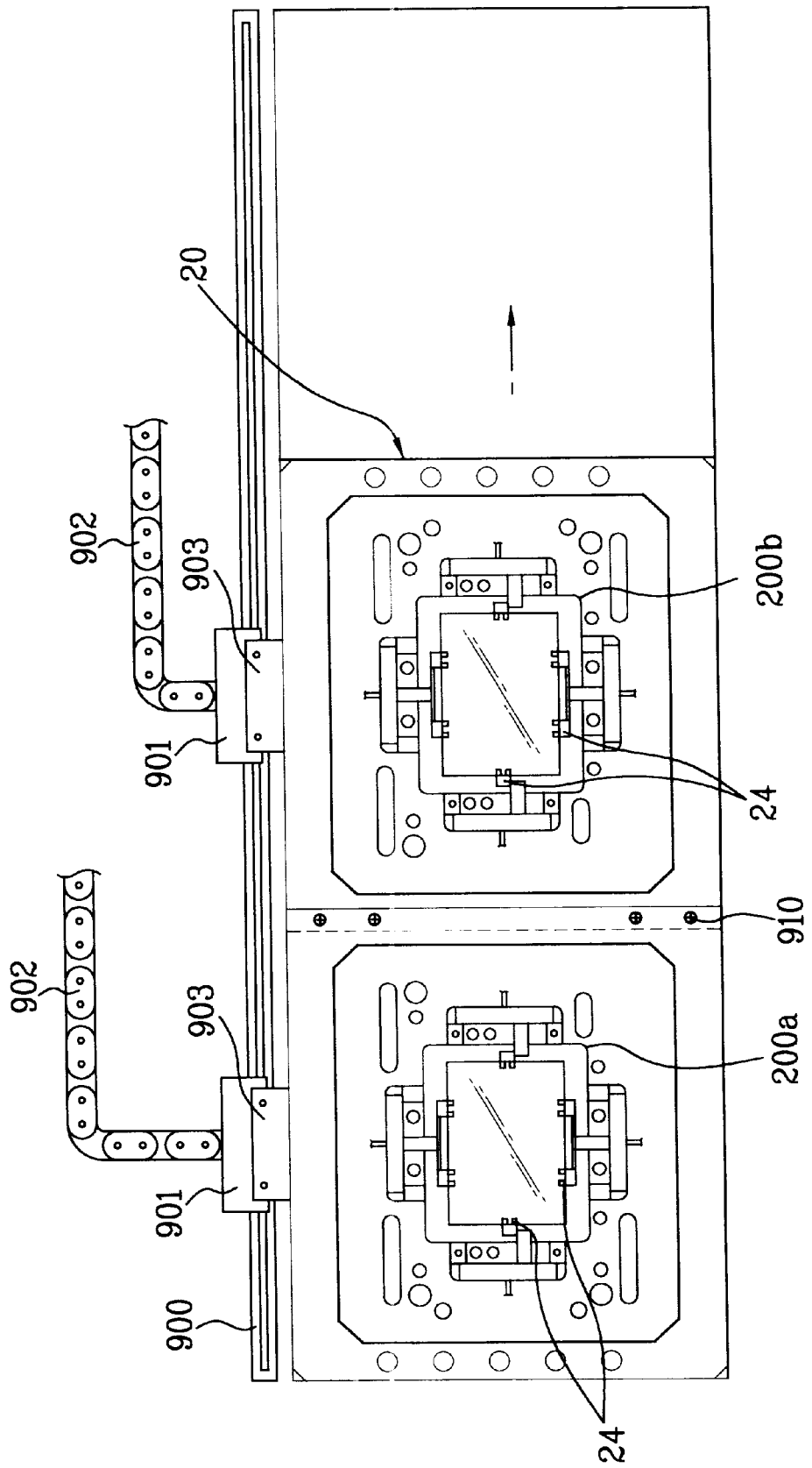
FIG. 13 illustrates a front view of another carrier and carrier driving means constructed in accordance with the teachings of the present invention.

FIG. 13 illustrates a front view of another carrier and carrier driving means constructed in accordance with the teachings of the present invention. A linear guide 900 is provided over the carrier 20, a linear motor 901 is mounted on the linear guide 900, and the linear motor 901 is coupled to the carrier 20. A mount bracket 903 is provided over the carrier 20 for coupling with the linear motor 901. The mount bracket 903 may be formed as a unit with the carrier. The linear motor 901 has a flexible cable 902 connected thereto for supplying power. The linear guide 900, the linear motor 901 and the flexible cable 902 may be provided below the carrier 20. The carrier 20 may be made of two dividable pieces. By unscrewing the fastening members 910, separating the left and right side pieces, and disposing the left and right side pieces on the right side and left side feeding/recovering sites respectively in maintenance and inspection of the test site, for easy access to the test site. The linear motor 901 minimizes vibration and noise during movement of the carrier 20, and permits precise control of the carrier movement in micron units.

Figure 14A:
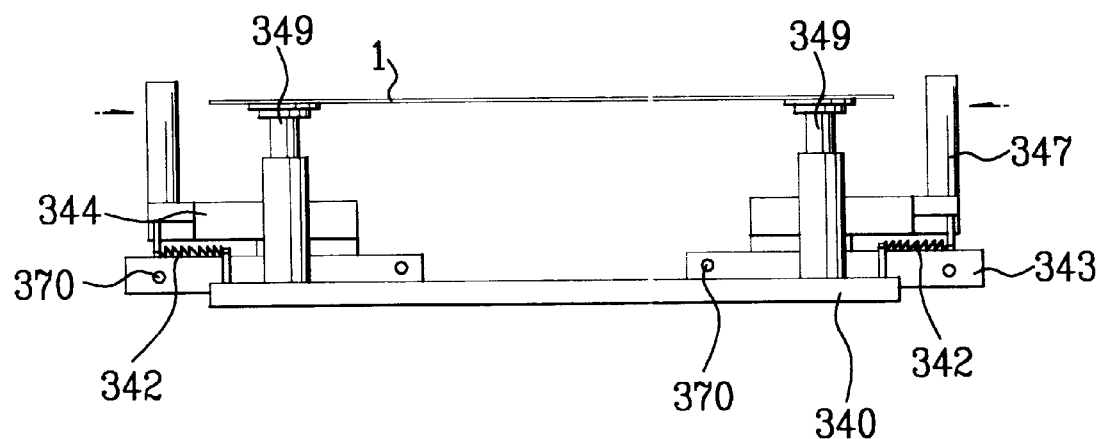
Figure 14B:
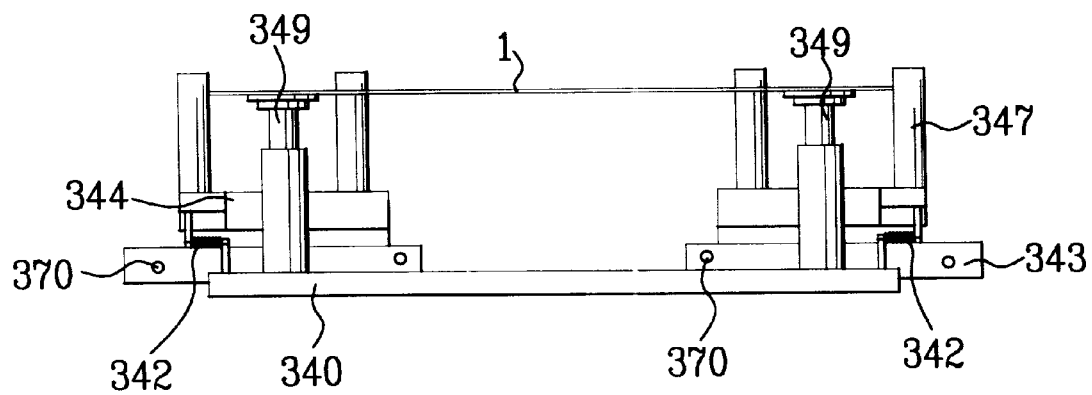

FIGS. 14A–14B illustrate another positioning mechanism constructed in accordance with the teachings of the present invention, wherein the aligning members 341 have a pneumatic system. That is, there are ports 370a and 370b in both sides of the guide rail 343 for supplying air, to move the slider 344 forward or backward by air supplied to either one of the ports, selectively. As shown in FIG. 14A, when air is supplied to outer ports 370a, the sliders move forward, to bring the vertical supporting bars 347 into close contact with sides of the LCD panel 1 thereby achieving alignment of the LCD panel 1 as shown in FIG. 14B. Applying air to the inner ports 370b has the opposite effect. If the positioning mechanism of FIGS. 14A–14B is used, the positioning mechanism is simplified relative to the mechanism of FIGS. 5–7B. That is, many components, such as the roller rods 346 and the rollers 345, the guide cone 352, the up/down rod 351, the cylinder 800, the return springs 342, and the like, can be omitted, thereby reducing a production cost and improving an operation reliability.

Figure 15:
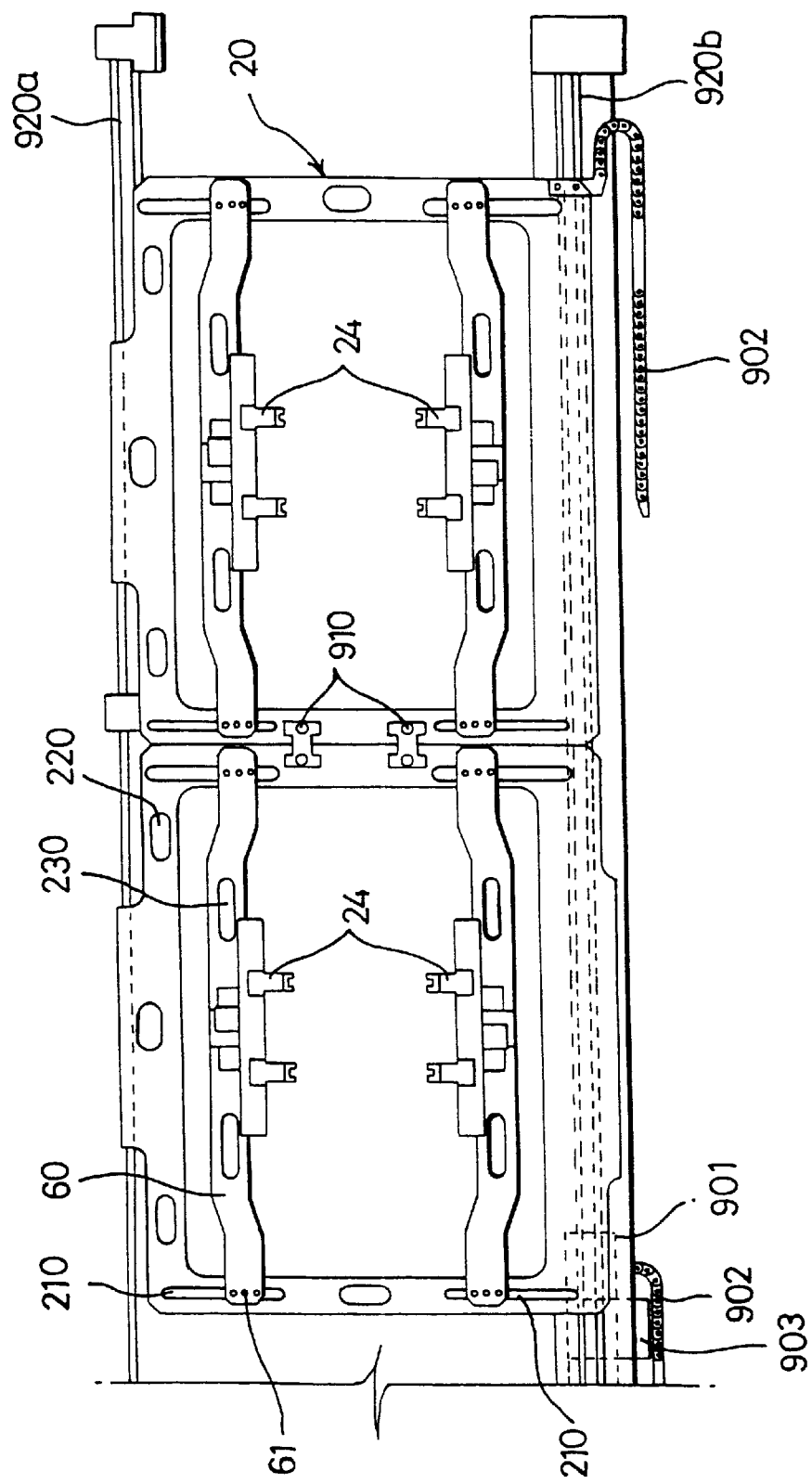
FIG. 15 illustrates another embodiment of a carrier and carrier driving means constructed in accordance with the teachings of the invention of the present invention.

FIG. 15 illustrates another embodiment of a carrier and carrier driving means constructed in accordance with the teachings of the present invention. This carrier is modified for general application and smoother operation.

One pair of fingers 24 (each having an upper finger and a lower finger) is provided at each side of the inside of each holding hole 200a. 200b for holding each side of the LCD panel. The fingers 24 are movable in upper and lower directions and left and right directions within the holding holes 200a or 200b. To do this, there are guide holes 210 defined in left and right sides of the upper and lower portions of the carrier 20 to which both ends of a supporter 60 is fastened by bolts 61. The guide holes 210 are elongated in upper and lower directions of the carrier 20 for adjusting a distance between the upper and lower supporters 60. The fingers 24 are removably fastened to the supporter 60 by means of bolts or the like, for permitting adjustment in left or right side. Only one finger 24 may be provided instead of one pair of fingers 24 in the holding hole 200a or 200b. However, it is preferable that pairs of fingers 24 are provided for stable holding of the LCD panel 1. Accordingly, whenever a size of the LCD panel to be tested is changed, distances between the supporters 60 should be adjusted appropriately by unscrewing the bolts 61 at both sides of the supporters 60. Distances between the fingers 24 should also be adjusted according to a similar method. There are a plurality of holes 220 and 230 in the carriers 20 and the supporters 60 for reduction of weight and material As means for driving the carrier 20, there is a lower guide 920b under the carrier. The lower guide 920b is fitted with a linear motor 901 and a flexible cable 902. There is an upper guide 920a over the carrier 20 for supporting an upper portion of the carrier 20. The carrier 20 is transferred in a stable condition, with the upper and lower portions thereof supported by the (guides 920a and 920b. The carrier 20 may be made of two dividable pieces, for unscrewing the fastening member 910, separating the left and right side pieces, and disposing the left and right side pieces on the right side and left side feeding/recovering sites respectively for easy access to the test site in maintenance and inspection of the test site. The foregoing carrier and carrier driving means have simple components that permits easier fabrication, reduces production cost, and reduce an overall weight to thereby reduce power consumption for transferring the carrier.

The illustrated LCD handlers have the following advantages. Because an accurate alignment of the LCD panel is made by mechanical operation without expensive cameras, the LCD handlers reduce production cost. The loading and unloading of the LCD panel to/from the test site by means of a light carrier permits faster, and precise operation, which saves power and is operative without vibration, thereby achieving improved reliability. Moreover, the LCD handlers are simpler than other devices thereby reducing operation errors, improving productivity. Reduction of handler size also facilitates effective utilization of space.

The disclosed LCD handler accurately aligns the LCD panel through a mechanical operation without expensive cameras. Loading and unloading of the LCD panels to/from the test site is faster and more accurate in the disclosed handler than in the prior alit. The disclosed handler also reduces vibrations by using less power. The disclosed LCD handler has high reliability.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An apparatus for testing an LCD comprising:
   a body having a test site for testing an LCD panel, and feeding/recovering sites on both sides of the test site for feeding and recovering the LCD panel;
   a pre-aligner rotatably in the rear of the feeding/recovering sites within the body, for aligning the LCD panel, and feeding the aligned LCD panel to a corresponding feeding/recovering site after alignment of the LCD panel;
   a carrier laterally moving in a front side of the body, for carrying a tested LCD panel to a first one of the feeding/recovery sites and an LCD panel to be tested and fed from a second one of the feeding/recovery sites to the test site; and
   driving means for moving the carrier in a lateral direction of the body,
   wherein the pre-aligner includes:
   (1) a frame mounted on a base to be rotatable around a shaft,
   (2) a positioning mechanism fixed to the frame for aligning the LCD panel fed by feeding means, and supporting the LCD panel,
   (3) switching means for rotating the positioning mechanism by 90° from the frame to change a position of the LCD panel,
   (4) a cylinder fitted between the frame and the positioning mechanism, for elevating the positioning mechanism with reference to the frame, and
   (5) rotating means fitted between the base and the flame, for rotating the frame.

2. An apparatus as defined in claim 1, wherein the positioning mechanism of the pre-aligner includes:
   a base plate mounted in the frame;
   an aligning member mounted on each side of the base plate to be movable in a radial direction of the base plate for supporting sides of the LCD panel;
   an up/down member mounted in a space where the aligning members come together for moving the aligning members forward or backward as the up/down member is moved; and
   fastening means on the base plate for fastening the LCD panel aligned by the aligning means.

3. An apparatus as defined in claim 2 wherein the up/down member includes:
   an up/down rod for making an up/down movement when driven by a driving force; and
   a guide cone fitted to a top of the up/down rod, so that the aligning member is brought into rolling contact with the guide cone, wherein,
      when the up/down member goes up, the aligning members are retracted as the aligning members are guided to a first outer circumference of the guide cone, and, when the up/down member goes down, the aligning members are advanced as the aligning members are guided to a second outer circumference of the guide conic smaller than the first outer circumference.

4. An apparatus as defined in claim 2, wherein there is a stopper having a supporting piece and an adjusting screw screwed in the supporting piece fitted in an inner moving region of each of the aligning members for limiting inward returning movement of the aligning member, wherein a stopping position of the positioning mechanism can be varied by rotating the adjusting screw either to advance toward the aligning member or to retract away from the aligning member.

5. An apparatus as defined in claim 2, wherein the aligning member includes:
   a guide rail on the base plate;
   a slider movable along the guide rail;
   a roller rod coupled with the slider;
   a roller fitted at an end of the roller rod; and
   supporting bars on the slider for supporting a side of the LCD panel.

6. An apparatus as defined in claim 5, wherein the slider is connected to a return spring for receiving a force biasing the slider toward a center of the base plate.

7. An apparatus as defined in claim 5, wherein the slider and the roller rod are coupled by an adjusting knob for correcting a position of the roller rod with respect to the slider as the adjusting knob is screwed/unscrewed.

8. An apparatus as defined in claim 5, wherein the supporting bars are formed of a soft material for softening impact with the LCD panel when the supporting bars are supporting the LCD panel.

9. An apparatus as defined in claim 2, wherein the fastening means for fastening the LCD panel is a suction device for fastening the LCD panel by a vacuum.

10. An apparatus as defined in claim 1, wherein there is a cylinder on the frame for elevating the positioning mechanism from the frame, a plurality of guides on the frame for making a stable elevation of the positioning mechanism, and a guide bar in each of the guides.

11. An apparatus as defined in claim 1, wherein the switching, means for rotating the positioning mechanism by 90° from the frame to change a position of the LCD panel comprises a step motor mounted on an elevating plate on the frame.

12. An apparatus as defined in claim 1, wherein the rotating means comprises:
   a geared motor for rotating a driving gear; and
   a spur gear fitted at one side of the frame in engagement with the driving gear.

13. An apparatus as defined in claim 1, wherein the rotating means comprises a cylinder fixed to the base and having a plunger hinge coupled to a lower end of the frame for making a linear motion to rotate the frame.

14. An apparatus as defined in claim 1, wherein there are stoppers in front and rear of a rotating section of the frame for damping vibration experienced by the LCD panel as the positioning mechanism is rotated.

15. An apparatus as defined in claim 1, wherein the driving means comprises:
   a screw shaft connected to the carrier;
   a ball screw block mounted on the screw shaft; and
   a motor to rotating the screw shaft in a regular/reverse direction.

16. An apparatus as defined in claim 1, wherein the carrier comprises a flat plate defining holding holes which are larger than the LCD panel and which are formed in both sides of a front face of the plate.

17. An apparatus as defined in claim 16, further comprising fingers located on at least two sides of the holding holes, the fingers being movable for selectively holding a plurality of sides inclusive of upper and lower sides of the LCD panel.

18. An apparatus as defined in claim 17, wherein the fingers are mounted to be selectively movable adjacent at least one of upper/lower sides and left/right sides of the holding hole formed in the carrier.

19. An apparatus as defined in claim 18, further comprising means for selectively moving the finger, the finger moving means including:
   guide holes elongated in upper and lower directions at upper and lower portions of both sides of the holding hole; and
   supporters positioned in symmetry at upper and lower sides of the holding hole, the supporters being fastened to the guide holes.

20. An apparatus as defined in claim 19, wherein there are a plurality of holes in the carrier and the supporters for reducing a total weight thereof.

21. An apparatus as defined in claim 17, further comprising driving means for the fingers, the driving means including an actuable cylinder for moving a preset distance to move the fingers.

22. An apparatus as defined in claim 16, wherein the carrier comprises two pieces divided at a portion between the two holding holes, and removably fastened by fasteners.

23. An apparatus as defined in claim 1, wherein the driving means includes:
   a linear guide on the carrier; and
   a linear motor on the linear guide coupled with the carrier.

24. An apparatus as defined in claim 1, wherein the positioning mechanism comprises:
   a guide rail fitted to each side of the base plate having ports for applying a pneumatic pressure on both sides thereof;
   a slider fitted on the guide rail to be movable in a radial direction of the base plate for selectively applying a pneumatic pressure to either one of the ports in both sides of the guide rail to move the slider in forward or backward; and
   a suction device for fastening the LCD panel aligned on the base plate.

25. An apparatus as defined in claim 1, wherein the driving means comprises:
   a lower guide fitted under the carrier; and
   a linear motor on the lower guide coupled to the carrier.

26. An apparatus as defined in claim 25, wherein the driving means further comprises an upper guide on the carrier for supporting an upper end of the carrier.

27. An apparatus for testing an LCD comprising:
   a body having a test site for testing an LCD panel, and feeding/recovering sites on both sides of the test site for feeding and recovering the LCD panel;

a pre-aligner in the body for aligning the LCD panel, and feeding the aligned LCD panel to a corresponding feeding/recovering site after alignment of the LCD panel;

a carrier for carrying the LCD panel fed to the feeding/recovering site by the pre-aligner to the test site; and, driving means for moving the carrier in a lateral direction of the body, wherein the driving means includes:
(1) a screw shaft connected to the carrier;
(2) a ball screw block mounted on the screw shaft; and
(3) a motor for rotating the screw shaft in a regular/reverse direction.

28. An apparatus for testing an LCD comprising:

a body having a test site or testing an LCD panel, and feeding/recovering sites on both sides of the test site for feeding and recovering the LCD panel;

a pre-aligner in the body for aligning the LCD panel, and feeding the aligned LCD panel to a corresponding feeding/recovering site after alignment of the LCD panel;

a carrier for carrying the LCD panel fed to the feeding/recovering site by the pre-aligner to the test site; and, driving means for moving the carrier in a lateral direction of the body, wherein the carrier includes a flat plate defining holding holes which are larger than the LCD panel and which are formed in both sides of a front face of the plate.

29. An apparatus as defined in claim 28, further comprising fingers located on at least two sides of the holding holes, the fingers being movable for selectively holding a plurality of sides inclusive of upper and lower sides of the LCD panel.

30. An apparatus as defined in claim 29, wherein the fingers are mounted to be selectively movable adjacent at least one of upper/lower sides and left/right sides of the holding hole formed in the carrier.

31. An apparatus as defined in claim 30, further comprising means for selectively moving the finger, the finger moving means including:

guide holes elongated in upper and lower directions at upper and lower portions of both sides of the holding hole; and supporters positioned in symmetry at upper and lower sides of the holding hole, the supporters being fastened to the guide holes.

32. An apparatus as defined in claim 31, wherein there are a plurality of holes in the carrier and the supporters for reducing a total weight thereof.

33. An apparatus as defined in claim 29, further comprising driving means for the fingers, the driving means including an actuable cylinder for moving a preset distance to move the fingers.

34. An apparatus as defined in claim 28, wherein the carrier comprises two pieces divided at a portion between the two holding holes, and removably fastened by fasteners.

35. An apparatus for testing an LCD comprising:

a body having a test site for testing an LCD panel, and feeding/recovering sites on both sides of the test site for feeding and recovering the LCD panel;

a pre-aligner in the body for aligning the LCD panel, and feeding the aligned LCD panel to a corresponding feeding/recovering site after alignment of the LCD panel;

a carrier for carrying the LCD panel fed to the feeding/recovering site by the pre-aligner to the test site; and, driving means for moving the carrier in a lateral direction of the body, wherein the driving means includes:
(1) a linear guide on the carrier; and
(2) a linear motor on the linear guide coupled with the carrier.

36. An apparatus for testing an LCD comprising:

a body having a test site for testing an LCD panel, and feeding/recovering sites on both sides of the test site for feeding and recovering the LCD panel;

a pre-aligner in the body for aligning the LCD panel, and feeding the aligned LCD panel to a corresponding feeding/recovering site after alignment of the LCD panel;

a carrier for carrying the LCD panel fed to the feeding/recovering site by the pre-aligner to the test site; and, driving means for moving the carrier in a lateral direction of the body, wherein the driving means includes:
(1) a lower guide fitted under the carrier; and
(2) a linear motor on the lower guide coupled to the carrier.

37. An apparatus as defined in claim 36, wherein the driving means further comprises an upper guide on the carrier for supporting an upper end of the carrier.

* * * * *

UNITED STATES PATENT AND TRADEMARK OFFICE
CERTIFICATE OF CORRECTION

PATENT NO.    : 6,353,466 B1
DATED         : March 5, 2002
INVENTOR(S)   : Kum Sung Park It is certified that error appears in the above-identified patent and that said Letters Patent is hereby corrected as shown below:

<u>Column 11,</u>
Line 14, delete "conic" and insert -- cone --.

Signed and Sealed this

First Day of October, 2002

Attest:

Attesting Officer

JAMES E. ROGAN
*Director of the United States Patent and Trademark Office*